United States Patent [19]

Kaufman et al.

[11] Patent Number: 5,573,120
[45] Date of Patent: Nov. 12, 1996

[54] STORAGE CONTAINER FOR COMPACT DISCS AND THE LIKE

[75] Inventors: Harrison Kaufman, Studio City; Michael B. Palmer, Los Angeles, both of Calif.

[73] Assignee: Pop-Pak, Limited, Vernon, Calif.

[21] Appl. No.: 203,776

[22] Filed: Feb. 28, 1994

Related U.S. Application Data

[63] Continuation-in-part of Ser. No. 52,974, Apr. 27, 1993, abandoned.

[51] Int. Cl.$^6$ .................................................. B65D 85/57
[52] U.S. Cl. .................. 206/755; 206/308.1; 206/310
[58] Field of Search .................... 206/307, 308.1, 206/310, 312, 313, 493, 738, 754, 755

[56] References Cited

U.S. PATENT DOCUMENTS

| | | |
|---|---|---|
| D. 332,048 | 12/1992 | Pennell . |
| D. 335,215 | 5/1993 | Stumpff . |
| D. 342,379 | 12/1993 | Taniyama . |
| 3,269,409 | 8/1966 | Brandt et al. . |
| 4,231,474 | 11/1980 | Takahashi . |
| 4,327,831 | 5/1982 | Inaba et al. . |
| 4,369,879 | 1/1983 | Egly et al. . |
| 4,420,079 | 12/1983 | Gliniorz et al. . |
| 4,449,628 | 5/1984 | Egly et al. . |
| 4,496,050 | 1/1985 | Kirchner et al. . |
| 4,511,034 | 4/1985 | Pan . |
| 4,535,888 | 8/1985 | Nusselder . |
| 4,629,067 | 12/1986 | Pavlik et al. . |
| 4,635,792 | 1/1987 | Yamada et al. . |
| 4,702,369 | 10/1987 | Philosophe . |
| 4,709,812 | 12/1987 | Kosterka . |
| 4,778,047 | 10/1988 | Lay . |
| 4,793,480 | 12/1988 | Gelardi et al. . |
| 4,844,260 | 7/1989 | Jaw . |
| 4,867,302 | 9/1989 | Takahashi . |
| 4,932,522 | 7/1990 | Milovich . |
| 4,951,826 | 8/1990 | Tompkins . |
| 4,978,005 | 12/1990 | Sammet . |

(List continued on next page.)

FOREIGN PATENT DOCUMENTS 2202349  11/1972  Japan .

OTHER PUBLICATIONS

"CD Lift Lock Jewel Box", Shape America, Inc., Biddeford, Maine.

*Primary Examiner*—Jacob K. Ackun
*Attorney, Agent, or Firm*—Poms, Smith, Lande & Rose

[57] ABSTRACT

A storage container including an outer case having a bottom tray and a cover hinged to it and a tongue assembly in the bottom tray. The tongue assembly can be integrally formed, with the bottom tray and/or the cover or separately formed and subsequently inserted into the bottom tray. When separately formed it can include an outer frame and a tongue extending from the frame side to which it is pivotally attached to the frame center. The tongue has a compact disc retainer mounted thereon for fitting into a center opening of a compact disc and holding the compact disc in the frame center when the tongue is in a "down" position. When the tongue is in an "up" position, pivoted relative to the one frame side, the compact disc is lifted up away from the frame and bottom tray for easy access thereto. The tongue, the frame and the hinge therebetween are preferably integrally formed together and as one unit. According to one embodiment the tongue is formed with a natural upward or raised bias, an elastic memory. A locking mechanism secured at least in part to the frame releasably holds the tongue in its down position. Another embodiment allows the tongue to be raised by pressing down on the end opposite to the free end, with a see-saw movement.

105 Claims, 11 Drawing Sheets

U.S. PATENT DOCUMENTS

| | | |
|---|---|---|
| 5,099,995 | 3/1992 | Karakane et al. . |
| 5,101,971 | 4/1992 | Grobecker . |
| 5,118,170 | 6/1992 | Olivas . |
| 5,135,106 | 8/1992 | Morrone . |
| 5,168,991 | 12/1992 | Whitehead et al. . |
| 5,176,250 | 1/1993 | Cheng . |
| 5,188,228 | 2/1993 | Barrett . |
| 5,193,681 | 3/1993 | Lievsay . |
| 5,211,283 | 5/1993 | Weisburn et al. . |
| 5,213,229 | 5/1993 | Taniyama . |
| 5,253,751 | 10/1993 | Wipper . |
| 5,259,498 | 11/1933 | Weisburn et al. . |
| 5,267,647 | 12/1993 | Stumpff et al. . |
| 5,279,097 | 1/1994 | Weisburn et al. . |
| 5,284,243 | 2/1994 | Gelardi et al. . |
| 5,284,248 | 2/1994 | Dunker . |
| 5,360,106 | 11/1994 | Nakayama et al. ............... 206/309 |
| 5,370,224 | 12/1994 | Karakane et al. ............... 206/309 |

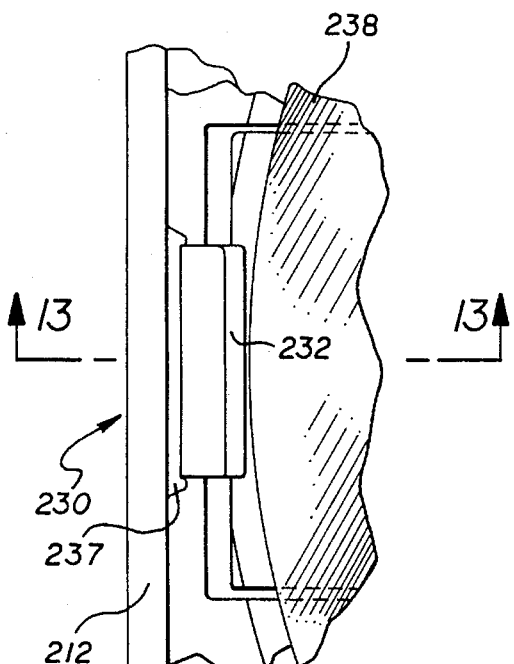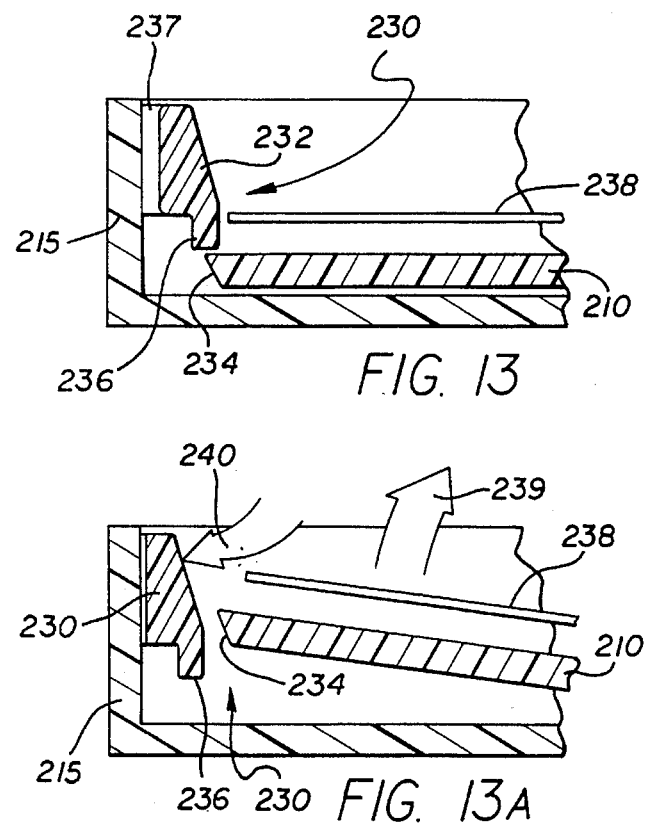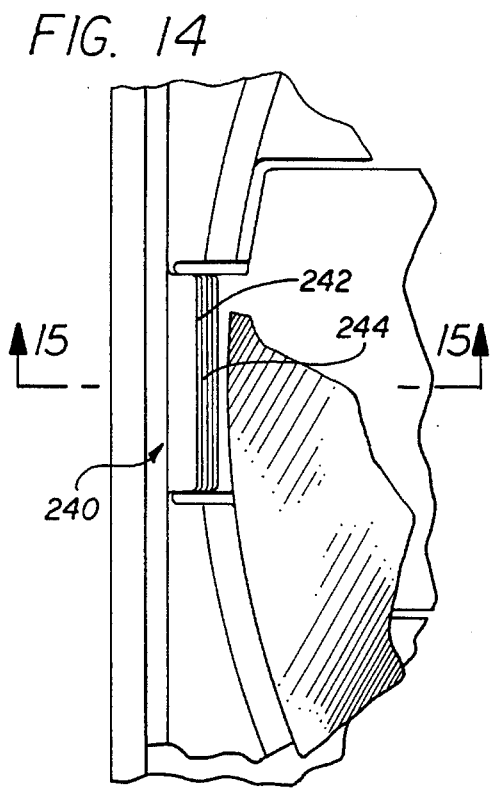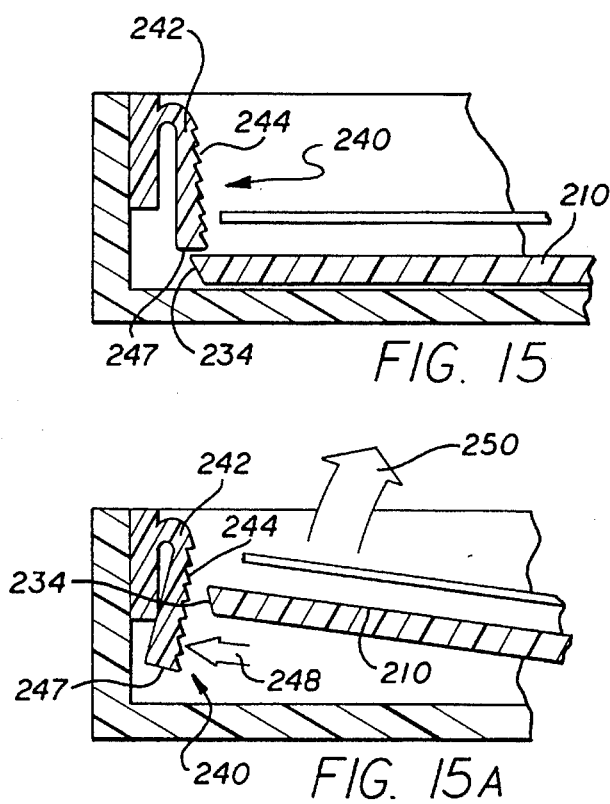

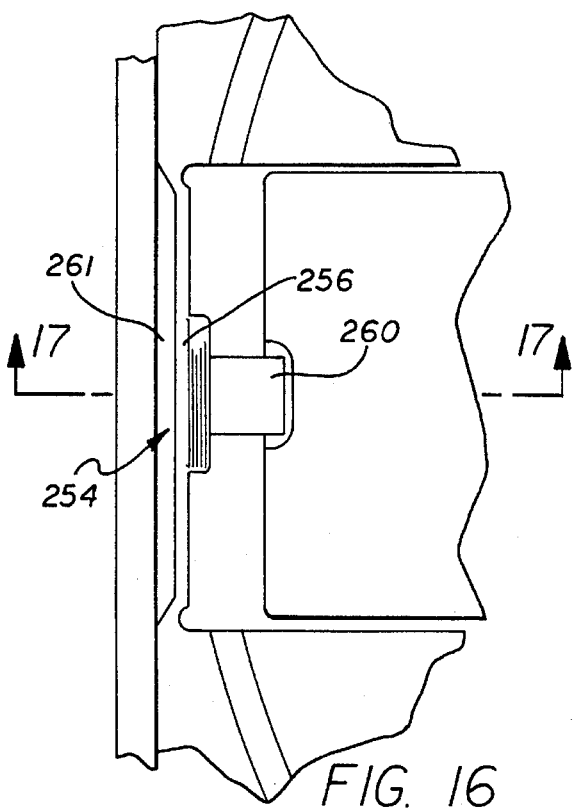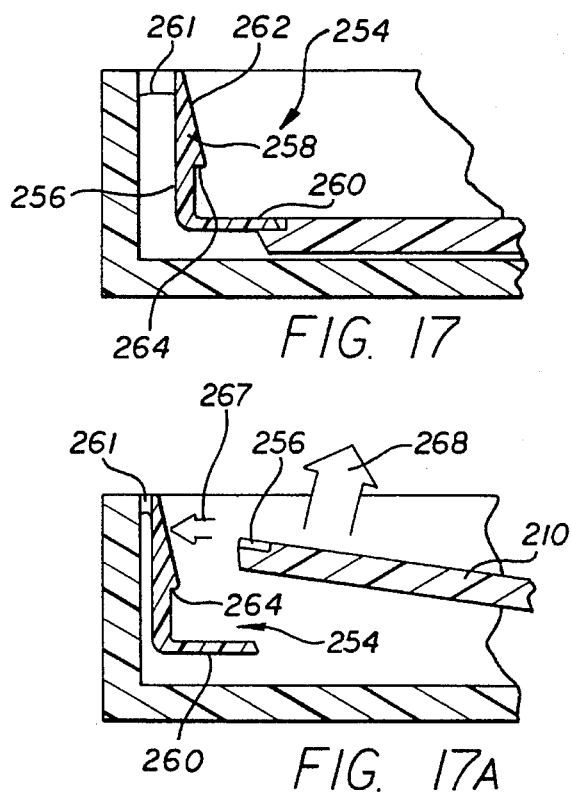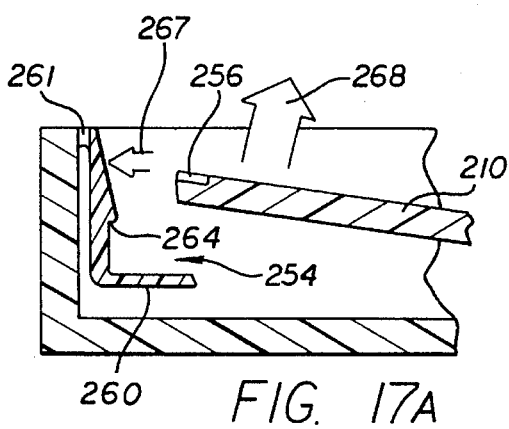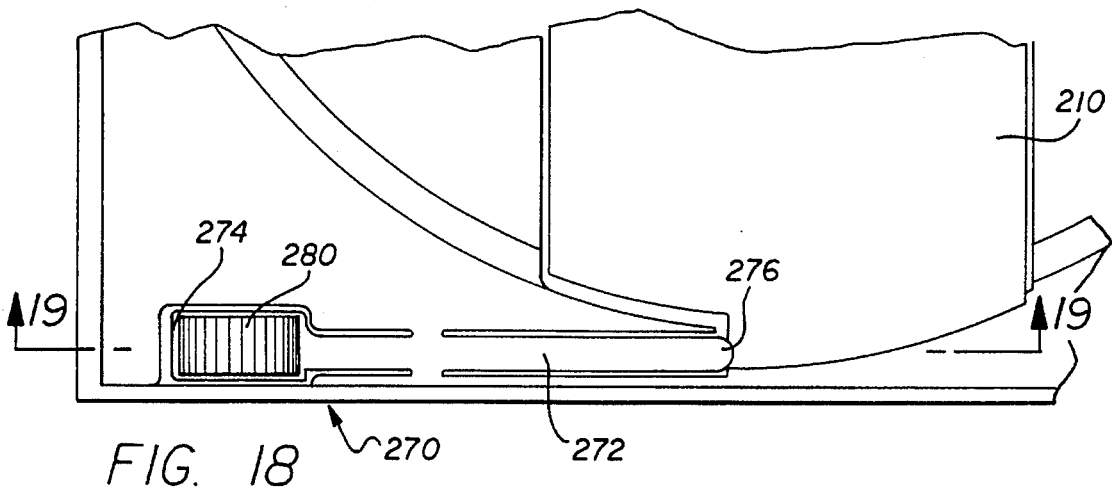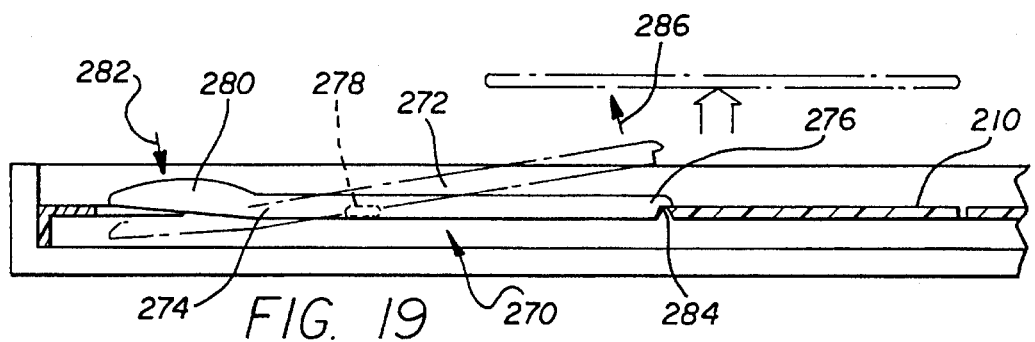

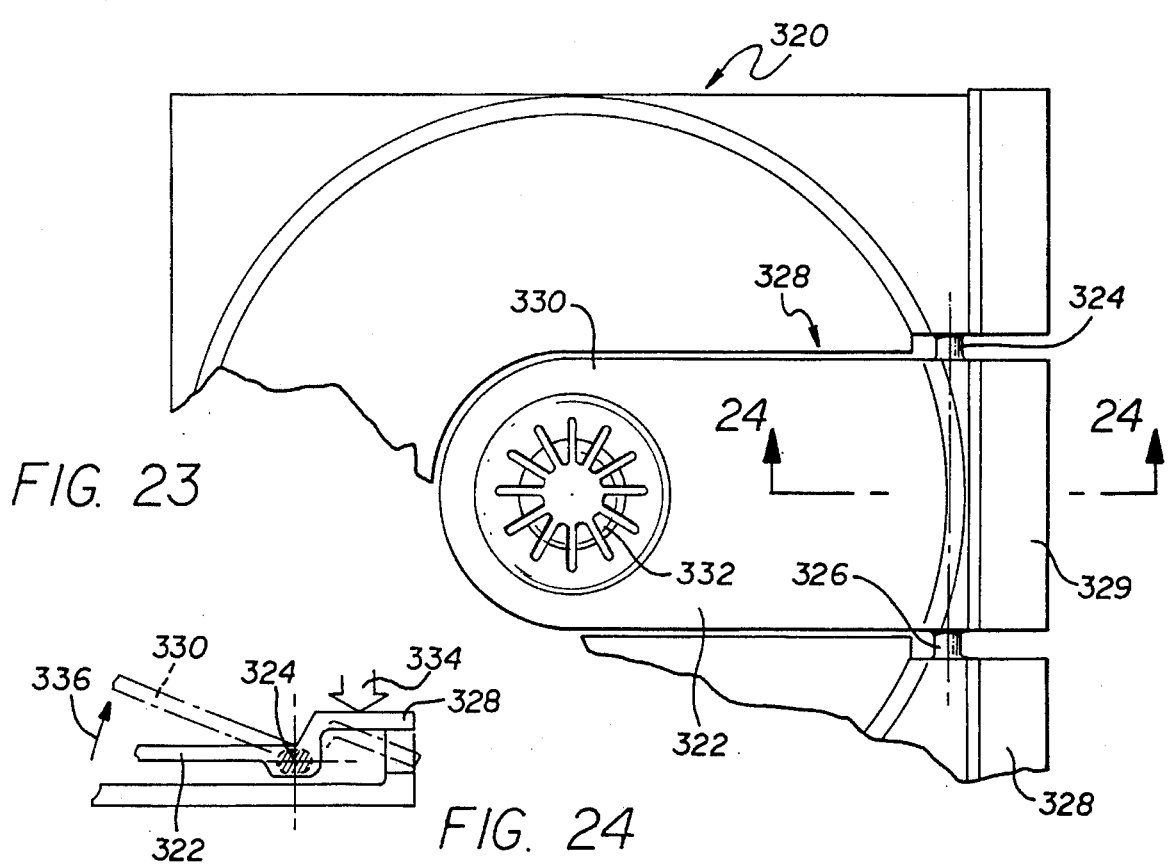
FIG. 23
FIG. 24
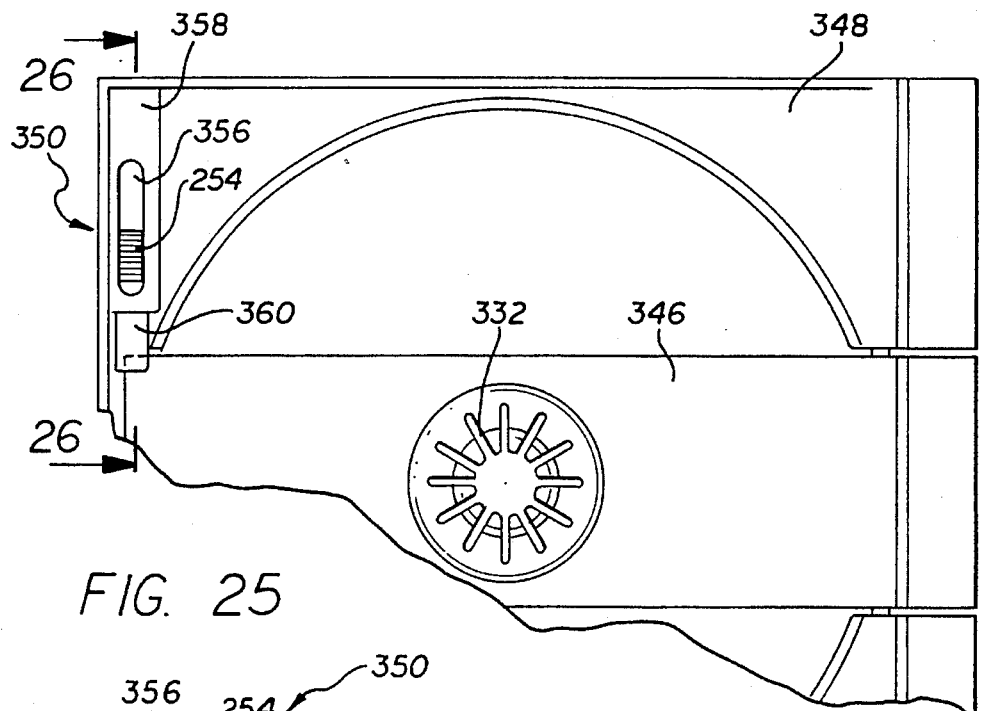
FIG. 25
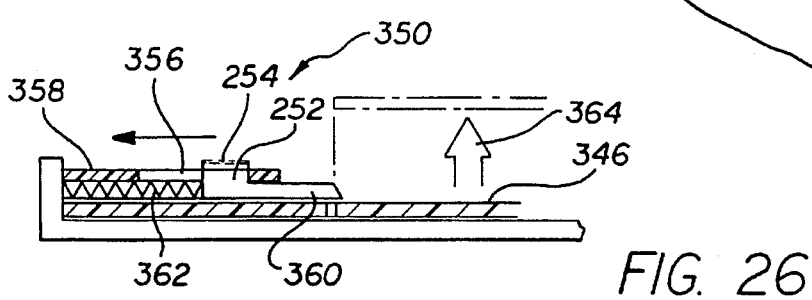
FIG. 26

STORAGE CONTAINER FOR COMPACT DISCS AND THE LIKE

CROSS-REFERENCE TO RELATED APPLICATION

This is a continuation-in-part of application Ser. No. 08/052,974, filed Apr. 27, 1993, now abandoned, whose contents are hereby incorporated by reference.

BACKGROUND OF THE INVENTION

The present invention relates to containers for storing recording media such as optical discs, optical magnetic discs, compact discs, disc cartridges, tape cassettes, computer diskettes, and compact audio discs, other flat articles and the like. It more particularly relates to such a storage container which when in an open condition includes means for moving the stored article, specifically a compact disc, off of the container's floor so that the article can be more easily accessed and lifted out of the container.

Compact discs are becoming increasingly popular due to their small size, durability, small thin dimensions and high acoustic quality, and because of an increasing number of compact disc players in use. They are rapidly replacing the old-style large vinyl discs as well as audio tape cassettes. Compact discs are thin, flexible plastic resin sheets with engraved digital patterns on their flat, round playing surfaces. Although compact discs are durable, they can be damaged if their playing surfaces are touched as when they are being removed from or inserted into their storage containers. Thus, compact discs when being handled should be gripped only by their outer peripheral edges.

Many containers for storing compact discs or similar objects (such as those listed above) are known. Examples of some of them are disclosed in U.S. Pat. Nos. 4,231,474; 4,327,831; 4,369,879; 4,420,079; 4,449,628; 4,469,050; 4,511,034; 4,535,888; 4,629,067; 4,635,792; 4,702,369; 4,709,812; 4,778,047; 4,793,480; 4,844,260; 4,867,302; 4,932;522; 4,951,826; 4,978,005; 5,099,995; 5,101,971; 5,118,170; 5,135,106; 5,168,991; 5,176,250; 5,188,228; 5,193,681; 5,211,283; 5,213,229; 5,259,498; 5,267,647; 5,269,409; 5,253,751; 5,284,243; 5,284,248; D322,048; D335,215; and D342,379; and German patent publication 2.202.349. The entire contents of each of these patents are hereby incorporated by reference.

One common container is the so-called "jewel box," which is a hinged, transparent storage box having dimensions similar to those of the compact disc itself. This box consists of three molded plastic parts, namely, a transparent base, a transparent cover hinged to the base and an opaque tray removably secured in the base and having a centrally-located, circular array of flexible spring fingers which engage the edge of the center hole of a disc. These boxes are used to display and continue storage of the discs after purchase thereof. However, due to their relatively flat and small size, they are very susceptible to theft. Thus, when displayed for sale in retail establishments these boxes are usually secured in various types of security packages.

Most prior containers do not provide easy access to the discs stored in them. To remove the disc it may be necessary to either shake the disc out of the container, which can result in the disc dropping on the floor and being scratched or otherwise damaged, or for the user to insert his hand into the container to withdraw the disc. This risks damage to the disc from oil, dirt, grit and the like from the user's hand. It further risks the user accidentally scratching the disc, with his fingernails. For many prior containers, removal of the discs from them can be a difficult and frustrating procedure.

One known storage container for recording media including compact discs is disclosed in U.S. Pat. No. 4,793,480 ('480) of Gelardi et al, and as commercially available as the "CD Lift Lock Jewel Box" from Shape America, Inc., of Biddeford, Me. The '480 patent shows a compact disc container which includes means providing access to the compact disc for removal of the disc from the container. This container is formed of numerous connected parts, however. Separate forming operations for the base, record holder, cover and actuator are needed, and separate steps are required for interconnecting these components to form the container. Additionally, separately formed cams and cam followers, linkages, wires or the like are needed to raise the holder to a compact disc access position when the lid is raised. The container thus is complicated and expensive to manufacture, thereby as a practical matter making it economically unsuitable for the packaging and commercial sale of compact discs.

Accordingly, there is a need for a lightweight, small storage container for compact discs and/or the like, which container has few parts, can be inexpensively made, and is durable. This container will have means for presenting the compact disc stored therein in an accessible position away from the bottom tray for easy and safe removal therefrom without damaging the disc and for easy insertion of the disc into the container for storage and shipping.

SUMMARY OF THE INVENTION

Directed to remedying the above-mentioned disadvantages in the prior art, numerous improved storage containers for compact discs and the like are herein disclosed. Generally they each comprise a box including a bottom tray and a cover positionable relative to the bottom tray between alternative open and closed positions. A tongue, positioned in the box, is pivotal between a lower storage position and a higher access position. The tongue has an upraised receiver on a top surface thereof for engaging a central aperture of a compact disc or other recording medium or similar, preferably round flat object. With a compact disc on the receiver, the tongue in the lower position and the cover in the closed position, the compact disc is protectively enclosed in the box for storage and/or shipment. Then subsequently, with the cover in the open position and the tongue in the raised position, a substantial portion of the compact disc is lifted out of the bottom tray, exposed and accessible for grasping of the edges thereof and careful removal out of the box. Different embodiments or variations of this concept are disclosed herein and discussed below.

One main embodiment includes the tongue, by the construction of the container, being biased up to the raised position, particularly with the cover in the open position. This biasing can be by a spring, camming mechanism or simply an adhesive strip folded over onto itself and positioned below the tongue. Alternatively, it can be by the mounting of the tongue to its support structure such that the elastic memory of the mounting or connection naturally biases the tongue to the raised position. A further embodiment includes the tongue extending across the bottom tray, with the receiver centrally located on the tongue between the connector and free ends thereof. With this tongue in the lower position and the cover in the open position, a locking mechanism can lock the tongue in the lower position. For example, the locking mechanism can include a locking member supported by a tongue assembly frame, to which the tongue is pivotally connected. The locking member in a locked position engages the free end of the tongue and when in an unlocked position disengages from the free end. Numerous locking member constructions are disclosed herein.

Another main embodiment of the present storage container includes the tongue being in a normal lower position and pivotable about a fulcrum. On one side of the fulcrum are the free end and the receiver, and on the other side is the "press down" surface. With the cover open and pressure applied to this surface the receiver is lifted, which lifts the compact disc held thereon to an easily accessible position. The tongue can be pivotally secured to a tongue assembly frame with the frame having a side opening or a corner opening. Then when this surface is not being pressed down it fits down into this opening.

The structure to which the tongue is pivotally secured can be an integral portion of the cover or the bottom tray. Alternatively, it can be a separate part insertable into and removable from the bottom tray. An advantage of this separate part construction is that the tray insert will fit inside the existing exterior standard jewel box. A preferred separate construction includes a rectangular frame with the tongue integrally formed to and with one side or one corner of the frame and therefrom extending towards the center of the frame. The semi-circular areas between the sides of the tongue and the parallel adjacent frame sides can be open to reduce the amount of plastic or other material being used, and thereby make the container lighter and less expensive. The tongue can extend all of the way across from the one frame side to the opposite frame side, or from one corner to a diagonal corner. Alternatively, the free end of the tongue can be spaced inwardly from the opposite frame side.

In other words, disclosed herein is an improved compact disc container which can be formed of light weight plastic, rubber, fiberboard or the like, and preferably plastic and made in a single molding operation. The container includes a box with a closed bottom, sidewalls and a top joined thereto at the upper end of sidewall to collectively define therewith a generally central, recessed compact disc storage space accessible from the top. The box also includes an integral disc mover which is configured as a tongue (or an elongated blade) that extends from one side of the box across the box towards the opposite side of the box below the recess space. The tongue has a free end carrying an unraised compact disc hole receiver and an opposite end hinged to the top and side of the box.

The container includes, according to one embodiment thereof, means connected to the disc mover for biasing the free end of the disc mover upwardly above the level of the top so as to provide easy access to a compact disc carried on the tongue. Such biasing means can be inherent in the tongue by fabricating the tongue with an elastic memory, so that when downward pressure on the tongue is removed its free end automatically springs up to the disc-exposing position. Alternatively, a spring can be formed below the tongue from the box bottom. Pursuant to another embodiment, the tongue can be hinged to the top and can have a rim which, when pressed downwardly, raises the free end of the tongue upwardly to the disc-exposing position. The container has a cover hinged to one end of the box and movable between a position overlying the top and covering the disc in the box and another position exposing the top and allowing the biasing means to pop the disc up out above the top on the tongue. In one embodiment the tongue extends substantially all the way across the box and is releasably held in the down position in the box by a detent formed in a wall of the box. The invention also contemplates the fabrication of an insert or tray having generally the same design of the disc mover noted above, which insert can be inserted into present compact disc containers. The insert and container can be formed in a single or separate molding or vacuum forming operations. This method of fabrication is simple, inexpensive and efficient.

That is, the compact disc container of this invention is constructed to permit a compact disc in the container to be removed from the container easily and swiftly without touching any part of the disc except its outer periphery, thereby avoiding the prior difficulties of removal of or hand damage to the disc. The container is a closed bottom tray with spaced, upwardly extending interconnected sidewalls and a top which defines a compact disc-receiving, generally central recessed space therein. The tray also contains an integral disc mover and an integral biasing means for biasing one end of the mover upwardly above the top of the tray, to provide easy access to the disc carried thereon. The mover is in the form of a tongue or blade formed from the bottom sidewall and the top of the tray, with one end of the tongue hinged to the top of the tray at the upper end of a sidewall. The free opposite end of the tongue extends below the recess and bears a compact disc hole receiver to releasably hold the disc on the tongue. The tongue can be biased, moved or lifted into the upward disc-exposing position by downward pressure on a rim connected to the hinge. Alternatively, it can be formed of plastic or the like suitably shaped, molded or cut to provide it with an elastic memory which causes the free end of the tongue to spring up automatically when a cover for the box, preferably hinged to one end thereof, is moved away from the top. In one embodiment the tongue extends across the entire box and is releasably held down by a detent (or other locking device) formed in a sidewall of the box. The storage container thereby is simple and inexpensive.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 12 is an enlarged, fragmentary top plan view of a first embodiment of the detent portion of the container of FIG. 11.

FIG. 13 is a cross-sectional view taken on line 13—13 of FIG. 12.

FIG. 13A is a view similar to that of FIG. 13, showing the tongue in an unlocked, releasing operation.

FIG. 14 is an enlarged, fragmentary top view of a second embodiment of the detent portion of the container of FIG. 11, for example.

FIG. 15 is a cross-sectional view taken on line 15—15 of FIG. 14.

FIG. 15A is a view similar to that of FIG. 15, showing the tongue in an unlocked, releasing operation.

FIG. 16 is an enlarged, fragmentary top view of a third embodiment of the detent portion of the container of FIG. 11, for example.

FIG. 17 is a cross-sectional view taken on line 17—17 of FIG. 16.

FIG. 17A is a view similar to that of FIG. 17, showing the tongue in an unlocked, releasing operation.

FIG. 18 is an enlarged, fragmentary top plan view showing an alternative tongue locking mechanism for the container of FIG. 11, for example.

FIG. 19 is a cross-sectional view taken on line 19—19, showing an unlocking operation of the mechanism of FIG. 18.

FIG. 23 is a fragmentary, top plan view of a tongue assembly insert of a storage container of the present invention.

FIG. 24 is a cross-sectional view taken on line 24—24 of FIG. 23, showing the tongue in a lifting operation.

FIG. 25 is a fragmentary, top plan view of another tongue assembly insert of a storage container of the present invention.

FIG. 26 is a cross-sectional view taken on line 26—26 of FIG. 25, showing the tongue in an unlocked, releasing operation.

DETAILED DESCRIPTION OF PREFERRED EMBODIMENTS

Figure 1:
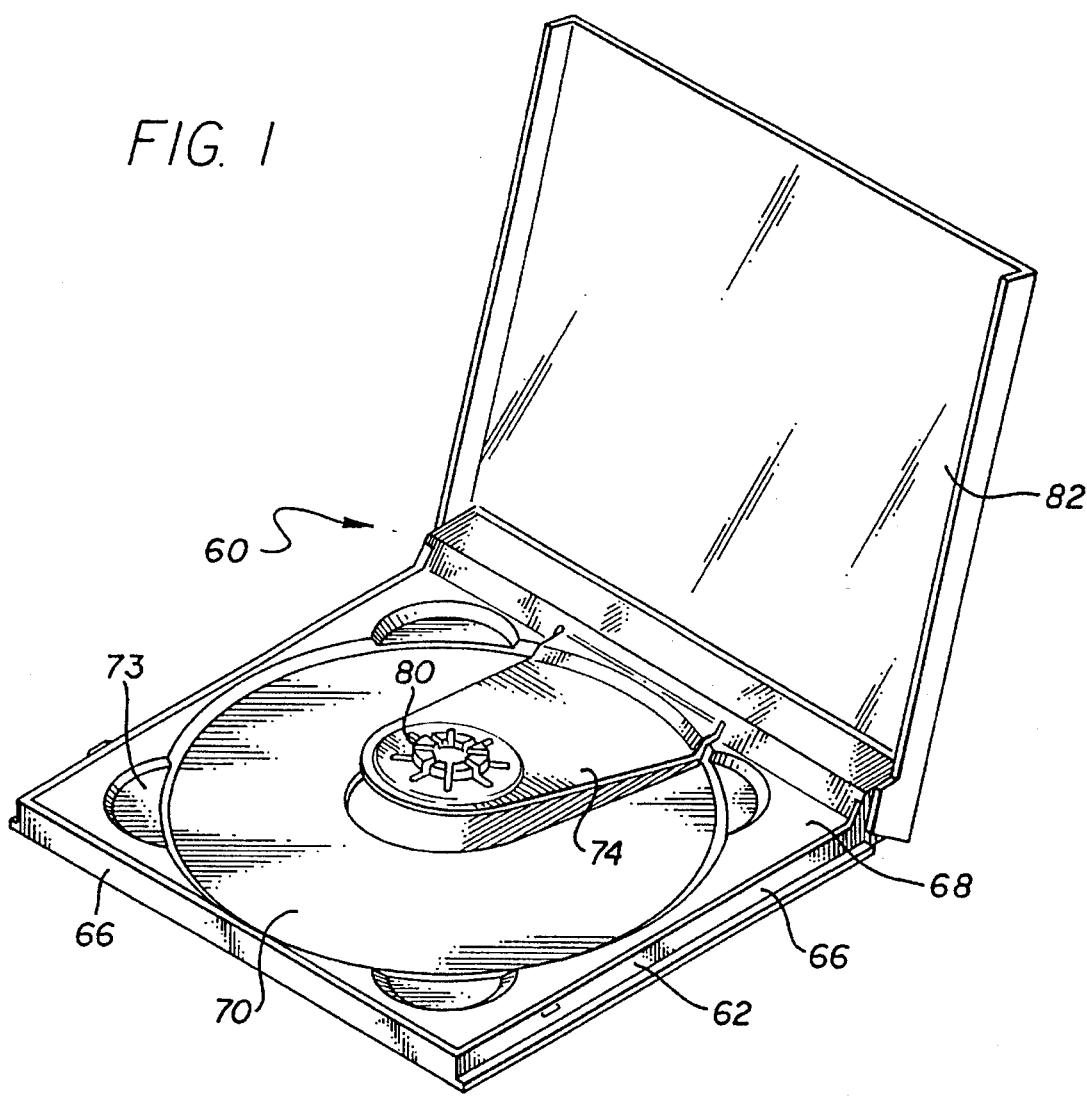
FIG. 1 is a top perspective view of a first compact disc storage container of the present invention.

Referring now to the drawings, wherein identical or corresponding parts are identified with the same reference numerals, numerous embodiments of the present invention are illustrated. It is within the scope of the present invention to interchange different parts and components of one or more illustrated embodiments for another, as would be apparent to those skilled in the art.

Figure 2:
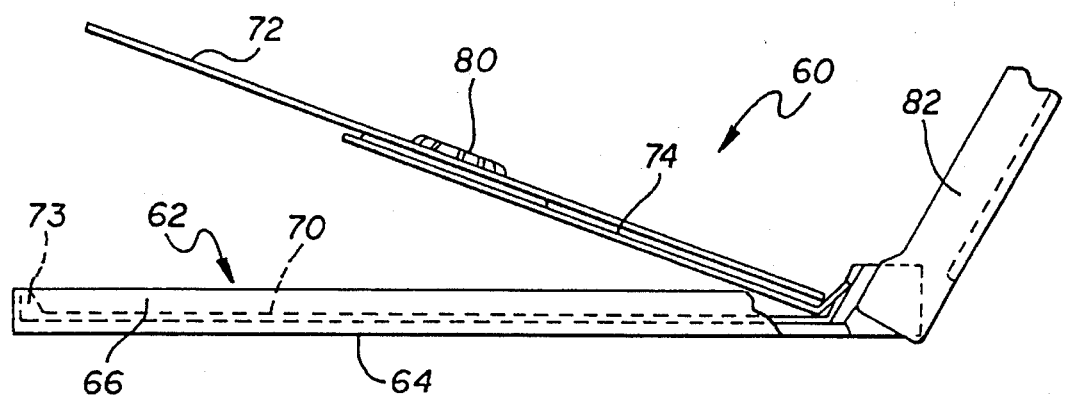
FIG. 2 is a side elevational view of the container of FIG. 1, showing the container in an open position and with a compact disc carried on the tongue of the container and in a raised, accessible position.

One improved compact disc storage container embodiment of the present invention is depicted in FIGS. 1 and 2 generally at 60. Container 60 includes a bottom tray or box 62 having a generally closed bottom 64 and interconnected, upraised and vertical sidewalls 66. These sidewalls 66 are relatively short so that the box 62 thereby has a shallow or flat profile for easy compact storage. The box 62 also includes a top area 68 which has a generally central, circular recessed space 70 which is dimensioned to receive a compact disc 72 therein. Fingergrip recesses 73 can be provided around the periphery of this space 70 if desired. A compact disc mover 74 in the form of an elongated tongue is also provided in the box 62 and formed therefrom in a single box molding operation. The tongue 74 can be cut from the bottom 64 and from a sidewall 66 and the top 68, leaving it hingedly attached at an end thereof and free of the box 62 at its opposite end. Alternatively, the disc mover or tongue 74 can be incorporated in a separate insert ("tray") out from which the tongue has been cut or together with which the tongue has been molded, and the insert can be inserted into a standard container or box, such as the outer "jewel container."

The tongue 74 extends out into the box 62 to underlie the recessed space, and the end thereof bears an upraised receiver 80 adapted to receive the central vertical hole in a compact disc 72 so as to releasably hold the disc on the tongue and in the space and also to keep it on the tongue when it is raised up therewith, as shown in FIGS. 1 and 2. The tongue 74 has an integral upward bias produced by an elastic memory inherent in the tongue as formed and shaped. This elastic memory causes the tongue 74 to automatically assume the raised position, as illustrated in FIG. 2, when it is not forced downwardly or held in the "down" position. Downward movement and the down position, according to this embodiment, are accomplished by a covered lid 82 hinged to the sidewalls 66 and movable between a top exposed position as shown in FIG. 2 and a closed position overlying the top 68 and forcing the tongue 74 down to hold the disc 72 in the space. The box 62 can include one or more detents 86 which are dimensioned to releasably and frictionally hold the cover or lid 82 down in place over the top by engagement with the cover lid sidewalls as will be described in detail later.

Accordingly, the container 60 is simple in construction and operation and is lightweight. It can be fabricated of rubber or plastic in a single or a few molding operations with simple cutting therefrom or molding of the tongue 74 to thereby provide an inexpensive, durable and efficient product which conveniently stores a compact disc 72 and biases the disc up out of the space whenever the cover or lid 82 is removed from the top. The tongue 74 can be molded in the raised position, for example, at an angle between fifteen and forty-five degrees, or preferably thirty degrees. When biased up, the disc 72 is exposed and readily accessible for removal from the box 62.

Figure 3:
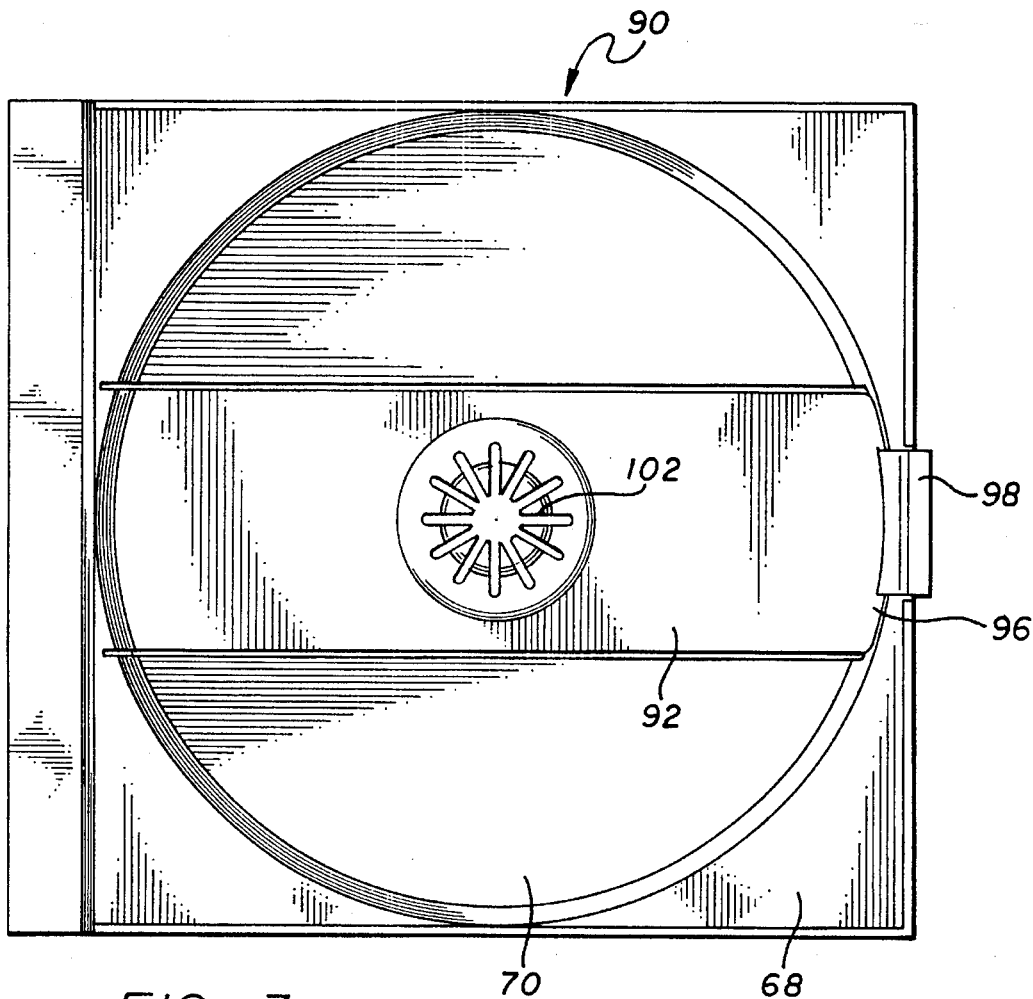
FIG. 3 is a top plan view of a second compact disc storage container of the present invention.
Figure 4:
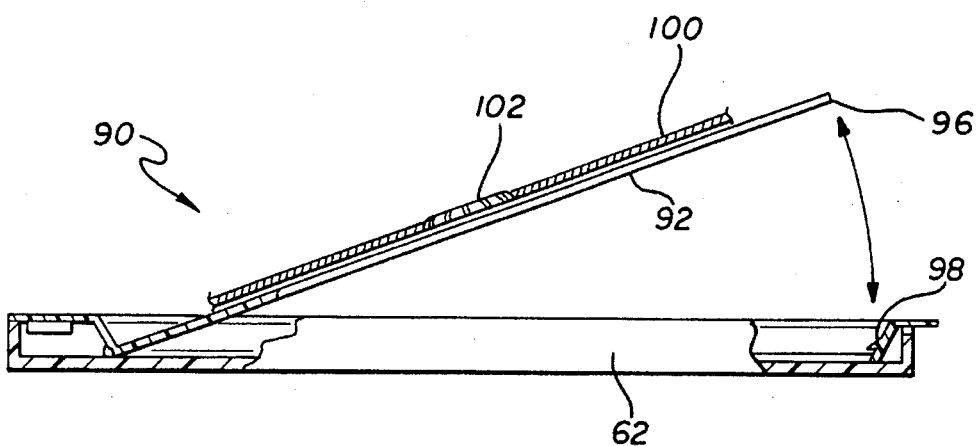
FIG. 4 is a side elevational view, partially broken away, of the container of FIG. 3, showing a compact disc positioned on the raised tongue thereof.
Figure 5:
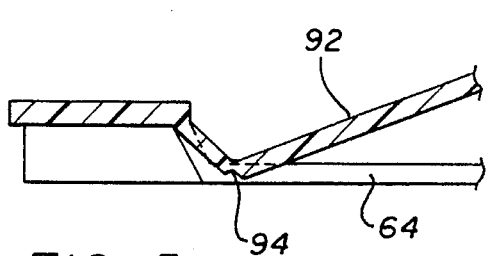
FIG. 5 is an enlarged, fragmentary side elevational view of the hinge portion of the tongue of the container of FIG. 3.

Another compact disc storage container of the present invention is shown in FIGS. 3 through 5 generally by reference numeral 90. Components similar to or corresponding to those of the container 60 of FIGS. 1 and 2 have been assigned the same numerals. Container 90 is substantially identical to container 60 except in the following four aspects.

(1) The tongue 92 extends the entire length (or width) of the box 62. It is hinged and is configured with an inherent upward bias, due to the undercutting of its point of connection with the top, as best shown in FIGS. 4 and 5 at 94.

(2) The free end of the tongue 92 has a tapered point 96 which is releasably engaged in the recess of a detent member 98 formed on the upper side. This detent member 98 can be disengaged from the tongue 92 by pressing forwardly (towards the front of the box) against it. This allows the tongue 92 to automatically swing up to the position shown in FIG. 4 wherein the disc 100 is above the box 62 and positioned to be readily removed from the tongue 92.

(3) The receiver 102 is at the midpoint of the tongue 92 rather than on its free end.

(4) The container 90 has no pivotal lid (82), but rather is designed to be placed in a cardboard dust sleeve, plastic container, or similar cover or enclosure from which it can be easily extracted.

Figure 6:
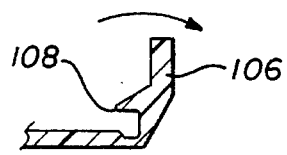
FIG. 6 is an enlarged, fragmentary side elevational view of a modified version of the detent portion of the container of FIG. 3.

FIG. 6 schematically depicts a modified version of the detent member 98 used in container 90. This detent member 106 is generally vertical and has an inwardly pointing hook 108. Detent member 106 can alternatively be molded into a top edge of the sidewall, if desired.

Figure 7:
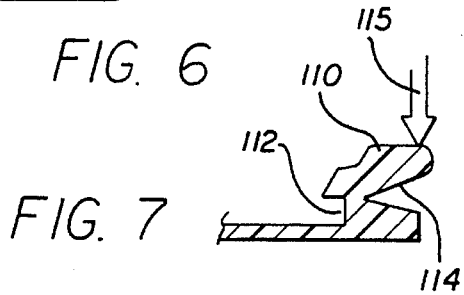
FIG. 7 is an enlarged, fragmentary side elevational view of another modified version of the detent portion of the container of FIG. 3.

FIG. 7 depicts yet another modified version of the detent member 98 used in the container 90 of FIGS. 3 and 4. This detent member 110 has a recess 112 to receive the end releasably and a split outer portion 114 which enables one to press down on the top of the detent member 110, with a force 115, to disengage it from the end of the tongue (92). The detent members 106 and 110 of FIGS. 6 and 7 can be substituted for the detent member 98 of FIGS. 3 through 5, if desired, with similar results.

Figure 8:
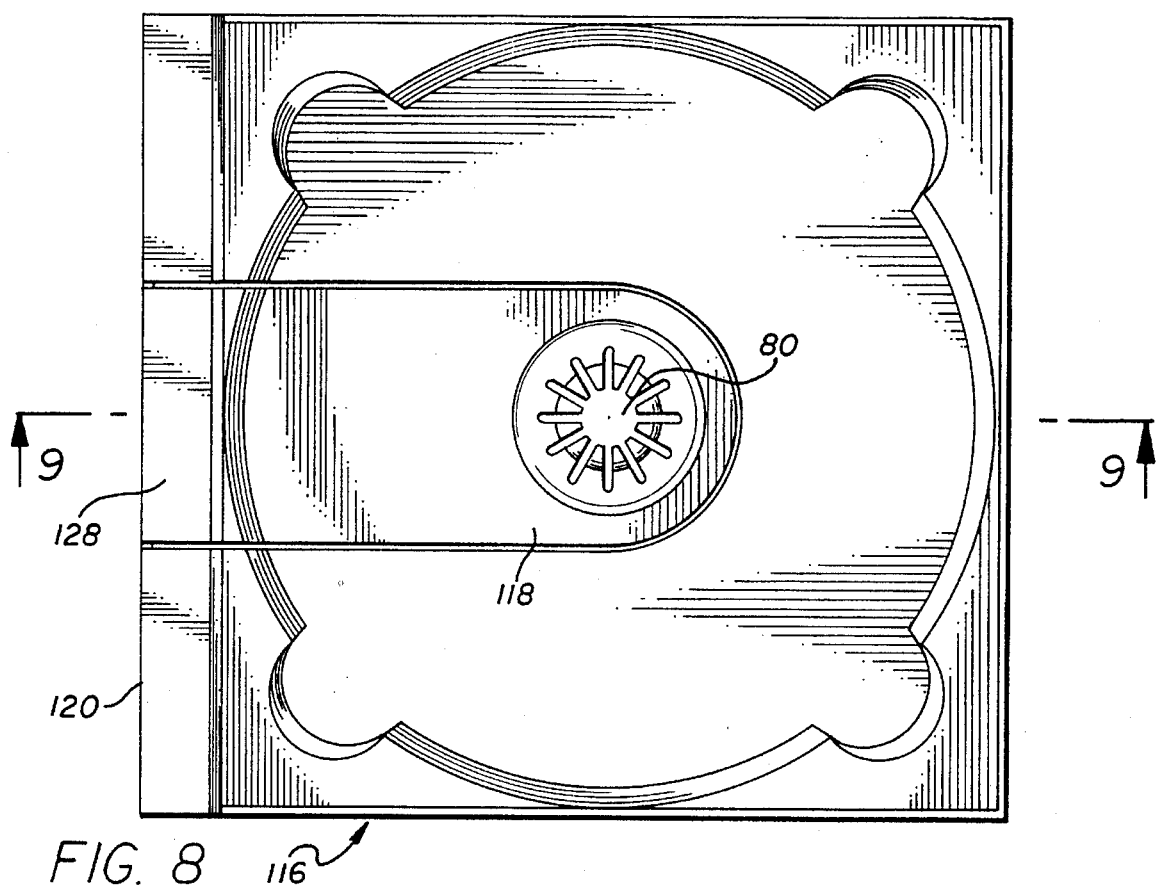
FIG. 8 is a top plan view of a third compact disc storage container of the present invention.
Figure 9:
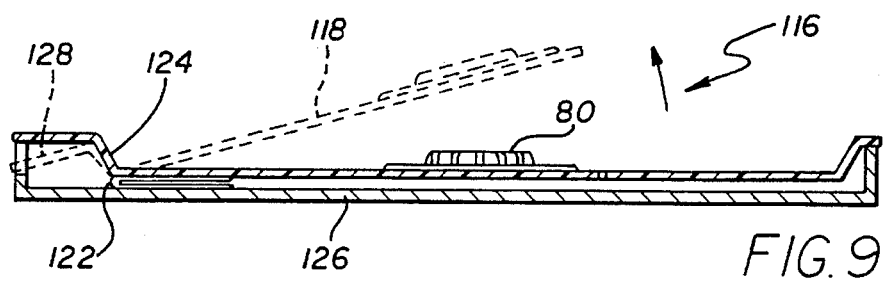
FIG. 9 is a cross-sectional view taken along line 9—9 of FIG. 8.

FIGS. 8 and 9 schematically show a third compact disc storage container embodiment of the present invention generally at 116. Container 116 is substantially identical to the container 60 of FIGS. 1 and 2 except that the tongue 118 has been internally cut away from the box 120 and has been hinged in place in the box by an adhesive strip 122 (FIG. 9) folded over onto itself and connected to the underside of the end 124 and to an underlying sheet of paper, plastic or the like 126 which is glued to the underside of the bottom. The end 124 is shaped to provide an integral push rim 128 which when pushed down moves the tongue 118 upwardly into the raised position shown in the dotted outline in FIG. 9. The disc container 116, however, has the advantages of the two previously-described containers 60 and 90.

Figures 10, 11:
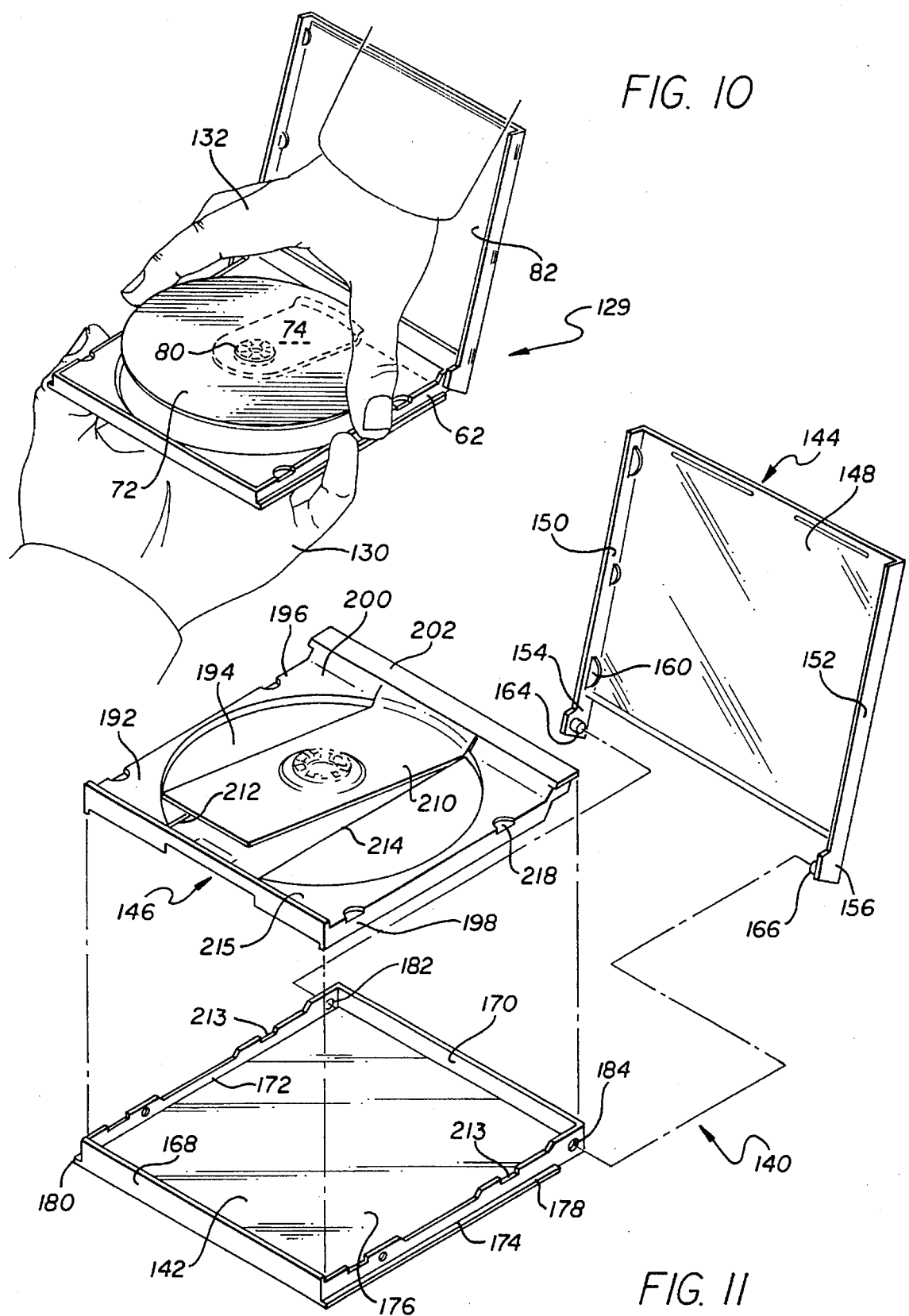
FIG. 10 is a perspective view of a fourth compact disc storage container of the present invention, showing the case in an open position and a compact disc being removed therefrom (or inserted thereinto).
FIG. 11 is an exploded perspective view of a fifth compact disc storage container of the present invention.

The operation of a compact disc storage container illustrated generally at 129 of the present invention is shown in FIG. 10. Although an embodiment similar to container 60 is shown, it will be understood that the operation would be similar for most of the other embodiments of this disclosure. As shown, the lid 82 is pivoted to an open position relative to the bottom tray 62. The tongue 74 is shown in its "natural" upwardly raised position raising the forward edge of the compact disc 72 thereon a distance of about two inches above the forward edge of the bottom tray 62. The receiver 80 on top of the tongue 74 is fitted in the central aperture of the compact disc 72 to hold the disc in place on the tongue. Removal of the disc 72 from the container 60 is easy. With the top opened and the tongue 74 raised as shown in FIG. 10, the bottom tray 62 is held by its sides by the user in one of his hands 130 and the user with his other hand 132 then grasps the side peripheral edges of the compact disc 72 and lifts it off of the tongue 74 and the receiver 80 and out of the container 60. The flat playing surfaces of the compact disc 72 are thus not touched thereby removing any risk of damage to them.

Inserting a disc 72 into an empty container 60 follows a generally reverse procedure to the above-described removal process. That is, with the lid or cover open and the tongue 74 raised, the disc 72 is positioned on the tongue so that its central aperture fits onto the receiver 80. If the tongue 74 is in a "locked down" position, it is not necessary to unlock it to a raised position in order to insert the disc 72. Once the disc 72 has been inserted (either with the tongue 74 in the raised or lowered position) the lid 82 is snapped closed, protectively enclosing the disc.

FIG. 11 shows another container embodiment of the present invention generally at 140, with the components illustrated in an exploded perspective relationship. It is seen that the container includes a bottom tray 142, a cover or lid 144, and an insert shown generally at 146 to be inserted into the bottom tray. The lid 144 includes a top plate 148, a pair of sidewalls 150, 152, ears 154, 156 attached to the rear ends of the sidewalls, spaced tabs 160 extending inwardly from the sidewalls beneath the top plate, and pegs 164, 166 extending inwardly from the ears. The bottom tray 142 similarly includes front and rear walls 168, 170, sidewalls 172, 174 extending between them and a bottom floor 176. The floor 176 extends a very short distance beyond the sidewalls 172, 174 to form lips 178, 180 which the sidewalls 150, 152 of the cover 144 abut down against when the cover is in a closed position. A pair of holes 182, 184 pass through the sidewalls 172, 174 at the rear corners thereof for receiving therein the pegs 164, 166 of the cover 144 to provide a pivotal axis for movement of the cover relative to the bottom tray 142.

The insert ("tray") 146 includes a top plate having a central circular recessed area 194 configured for storing therein a compact disc. The recessed area 194 (see FIG. 27) can engage the insert sidewalls at central portions thereof so that the disc when in the recessed area overhangs, by only a fractional distance, the central portions of the sidewalls. The disc then fits into the corresponding lower portions of the sidewalls of the bottom tray 142. The insert 146 has sidewalls 196, 198 particularly at the corners thereof, that is, where the recessed area 194 does not engage the edges of the top plate 142. At the rear edge of the insert 190 is a step 200 with an elongated tab or member 202 formed on top of it. With the container 140 assembled, the pivoting of the pegs 164, 166 on the cover 144 relative to the holes 182, 184 of the bottom tray 144 then takes place beneath the elongated member 202. When the cover 144 is pivoted to a closed position, the elongated member 202 forms part of the top surface of the container 140 with the forward edge of the elongated member abutting the rear edge of the top plate 148 of the cover.

The tongue 210 is integrally formed as part of the insert 190. It can be formed with cuts or an open (molded) perimeter 212, 214 extending generally the length of the top of the insert 190 and extending a distance up the step 200 to the elongated member 206. Or, the tongue 210 can be formed and molded in the raised position. Thus, the hinge between the tongue 210 and the insert 190 is along the rear edge of the tongue, generally at the junction of the tongue and the rear edge of the recessed area 194. The tongue 210 together with the rest of the insert 190, that is, the insert rectangular frame 212, can be formed in an injecting molding procedure or a vacuum molding procedure wherein the tongue is formed in its raised position at about a twenty to forty-five or preferably a thirty degree angle, depending on the elasticity of the plastic. This technique is a high production molding process. The insert 146 (or any of the other inserts disclosed herein) can be made of polyethylene, polypropylene, a cross-linked polystyrene, or an ABS polystyrene. An alternative method of forming the tongue 210 is to form the insert 190 and then cut the tongue out along its sides and forward end and then bias the tongue upward by melting the tongue into a softened, malleable state, raising the tongue into the upward position, and thereafter cooling the tongue in that raised position to hardness so that it remains elevated. That is, the tongue 210 and frame 212 are formed into or out of the same continuous material, and an elastic memory is instilled in the tongue.

The bottom tray 142 has a pair of indents 214 on both sides of the sidewalls, and the insert 146 has a corresponding semi-circular recessed areas 218 along both of its side edges 196, 198 and corresponding to the indents 214. Thus, when the lid 144 is lowered to its closed position, the tabs 160 on the lid will rest downwardly in the indents 214 and the semi-circular recessed areas 218 and thereby hold the insert 190 down against the floor 176 of the bottom tray 142. Thus, when the case or container 140 is inverted or shaken back and forth, the insert 190 and compact disc (100) do not likewise rattle back and forth thereby impacting the lid 144. The primary function of tabs 160 though is to hold graphics, that is, a sheet of paper (not shown) with explanatory or advertising information on it, in place in the container and viewable through the transparent top cover. The insert 190 can have a number of tiny outwardly-disposed pegs on the sidewalls thereof positioned to snap into corresponding inwardly-disposed holes or openings in the sidewalls of the bottom tray 142 to snap-fit hold the insert 190 into the tray as can be understood from FIG. 31.

FIG. 12 is an enlarged view showing generally at 230 a tongue locking mechanism of the container 140 of FIG. 11, for example. FIG. 13 is a cross-sectional view taken through FIG. 12, and FIG. 13A is a view similar to FIG. 13 but showing the tongue 210 in an unlocked and releasing operation. As seen in the drawings a downwardly-extending locking tab 232 is formed on the frame 212 of the insert 146 at a central front location thereof and extending downwardly so that its lower surfaces are generally in the plane of the recessed area. The forward edge 234 of the tongue 210 is upwardly angled as depicted in FIG. 13 and when pressed down presses against the downward tab 236 of the elastic locking member forcing it or flexing it rearward a small distance against a compressible elastic connector, flexible plastic piece or a hinge 237 and allowing the forward edge 234 of the tongue 210 to pass by and underneath it, as shown in FIG. 13, and into a locked position. (In lieu of or in addition to resilient hinge 237, the portion of the insert wall 212 to which the tab 232 is attached can be flexible.) The upward bias of the tongue 210 is thereby restrained by the engagement against the lower surface of the tab 236, holding the tongue 210 and thereby the compact disc thereon in a down, storage position. The overlap of the tip of the tongue 210 against the bottom part of the tab 236 is only a very small distance. Thus, when only a small manual force against the rear surface of the tab, as shown by arrow 240 in FIG. 13A, is applied to the locking tab 232, the tab is pushed forwardly a slight distance sufficient to allow the front edge 234 of the tongue 210 to clear the lower surface of the tab 236. Due to the natural upward bias of the tongue 210, the tongue, together with the compact disc 238 thereon, pivot upwardly as shown by the arrow 239 in FIG. 13A.

An alternative locking mechanism is shown in FIGS. 14, 15 and 15A generally at 240. Instead of the locking member 232, a downwardly-inclined locking member 242 having a rearward serrated, ribbed, or scored face 244 is provided integrally formed with the insert 146. As the tongue 210 is pushed downwardly the edge of its free end engages the ribbings on face 244 pushing against them in successive locking steps and travels or ratchets down the face pushing the tab 242 forwardly until the tongue front edge is beneath the bottom surface 247 of the tab at which time the tab springs rearwardly a short distance over the free edge of the tongue 210. In this position, the tab 242 holds the tongue 210 down, as shown in FIG. 15, against the natural upward bias of the tongue. Unlocking this locking mechanism 240 is easy, a forward force as shown by arrow 248 against the face 244 of the locking member 242 is applied, as with a fingertip or a fingernail, thereby pushing the lower edge 247 of the tab member 242 forwardly a distance until it has cleared the front edge 234 of the tongue 210 and the tongue then snaps upwardly, as shown by the arrow 250 in FIG. 15A.

FIGS. 16, 17 and 17A illustrate a third locking mechanism of the present invention generally at 254. It is seen that the locking mechanism 254 includes an angled member 256 having its top portion 258 integrally formed with the insert frame and its lower horizontal portion or tab 260 angled rearwardly. The attachment or hinge of the vertical portion 258 of the angled member to the frame is by a resilient attachment or hinge 261 allowing the angled member 256 to be pressed on its angled rearward face 262, as shown by arrow 264 in FIG. 17A, forwardly to move a short distance forwardly. The hook 264 on face 262 is provided to hold the tongue until it is released in the down "locked" position (for packaging purposes). When the end of the horizontal member 260 is engaged in the indent 266 in the top surface of the forward edge of the tongue 210, thereby holding the tongue in a locked position, as shown in FIG. 17. Thus, when in the locked position, a small force 267 can be applied to the rear surface 262 of the vertical member 258 forcing the horizontal member 260 forwardly a short distance about hinge 261 and thereby disengaging the edge of the horizontal member from the indent 266 in the tongue 210. This disengagement allows the tongue 210 to be raised by its bias as shown by arrow 268.

FIGS. 18 and 19 illustrate a further alternative locking mechanism generally at 270 and comprising a lever or see-saw type member 272 having a first end 274 and an opposite second end 276, both pivotable about a fulcrum 278. The see-saw member 272 is in a naturally flat orientation due to the bias of the fulcrum 278. When the enlarged head 280 of the first end 274 is pressed downwardly, as shown by arrow 292, the second end 276 is lifted upwardly, as shown by arrow 282, so that the catch member 284 at the end of the second end disengages or releases from the forward edge of the tongue 210, thereby allowing the tongue to be biased upwardly, as shown by arrow 286.

Figure 20:
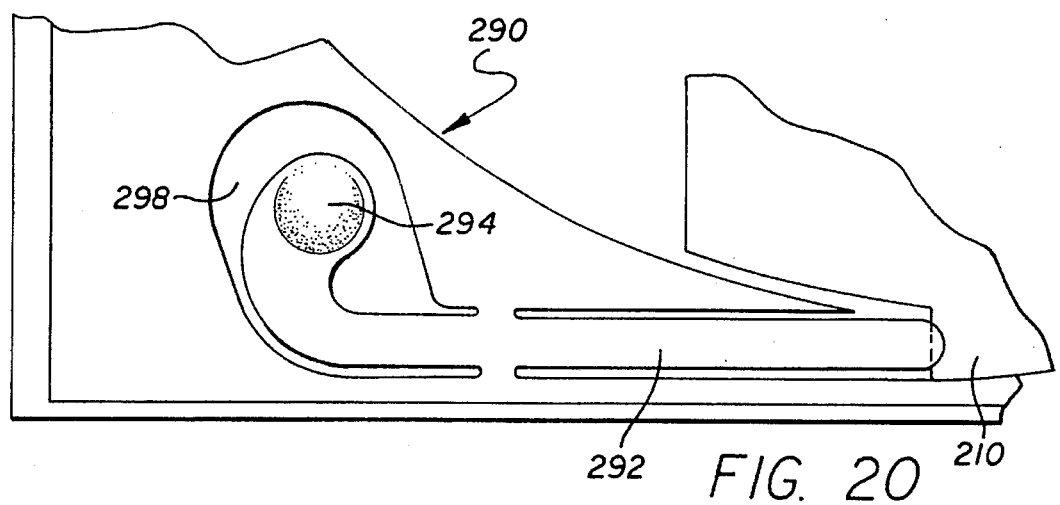
FIG. 20 is a view, similar to that of FIG. 18, showing a further alternative tongue locking mechanism of the present invention.

FIG. 20 illustrates generally at 290 a top view of an alternative locking mechanism including an elongated member 292 and a curved head member 294 connected to one end thereof. When in its natural position the edge of the elongated member 292 overhangs on top of the tongue 210 thereby retaining the tongue in a locked position. Then when the head member 294 is pressed down, the locking end of member 292 is raised up thereby unlocking the tongue 210 due to the following action. A cutaway portion 298 in the top plane of the insert is provided so that the head member 294 can be pressed down. The head member 292, after being pressed down and released, lifts up due to the natural bias of its fulcrum construction. Locking mechanism 290 is advantageous over locking mechanism 270 as it provides greater access space to the release mechanism for the consumer's finger or thumb. Thus, by curving it in the button or head member is spaced inward from the wall making it easier for the user to access and push.

Figure 21:
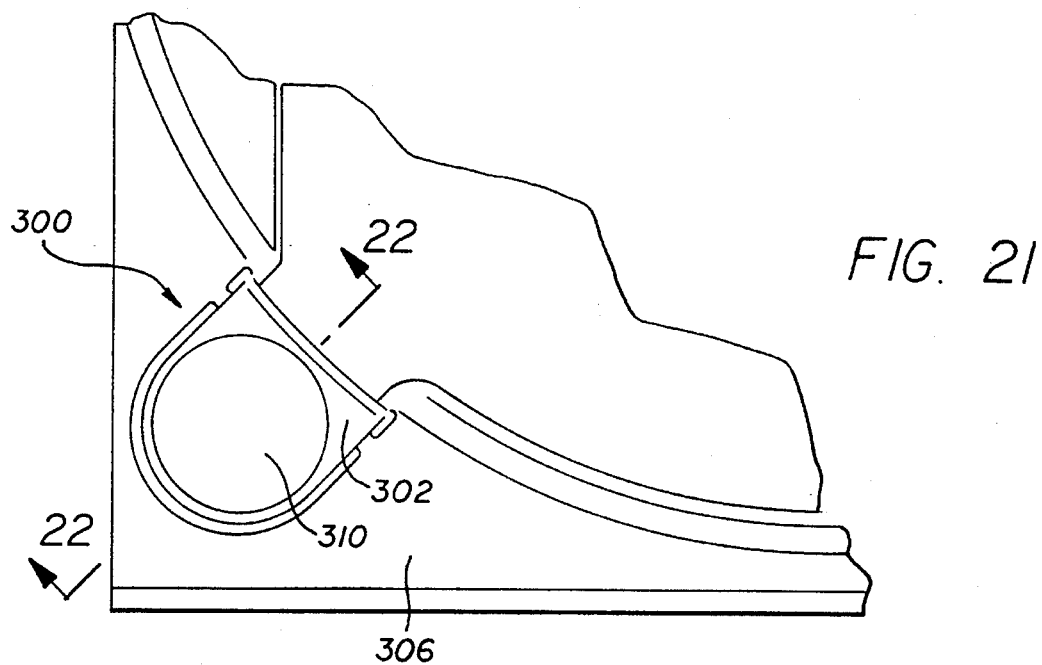
FIG. 21 is a view, similar to those of FIGS. 18 and 20, showing a still further alternative tongue locking mechanism.
Figure 22:
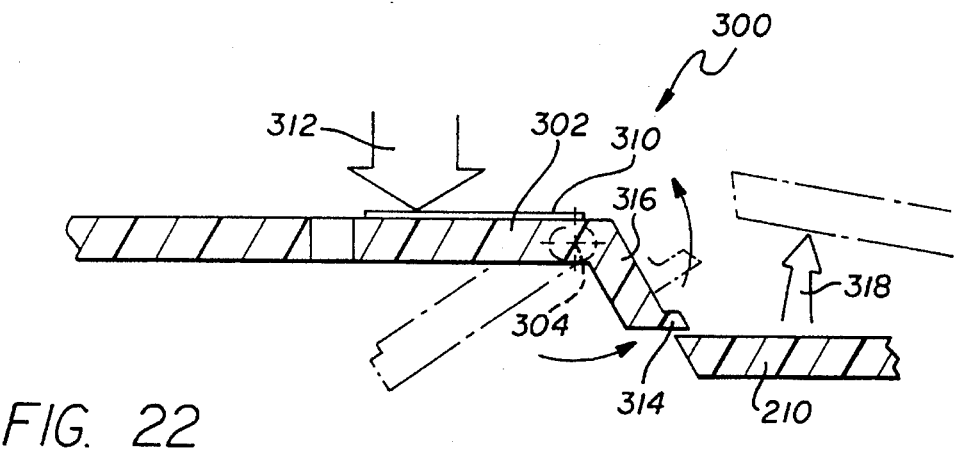
FIG. 22 is an enlarged cross-sectional view taken on line 22—22 of FIG. 21, showing an unlocking operation of the mechanism.

Another locking member is shown in FIGS. 21 and 22 generally at 300. Locking mechanism 300 is another see-saw embodiment wherein the lever or see-saw member 302 is integrally formed with the fulcrum or hinge 304 and the surrounding insert 306 (or 146) and at a corner thereof. On the outside portion of the member 302 is an enlarged round head 310 providing a surface against which the user can press his finger as shown by the arrow 312 in FIG. 22. With this "pressing down" motion, the see-saw member 302 pivots so that the far end 314, which is angled downwardly by portion 316, pivots upwardly out of the way of the tongue 210 allowing the tongue to rise, as shown by arrow 318.

FIGS. 23 and 24 show an insert 320 wherein the tongue 322 does not have a natural upward bias and no other upwardly biasing means is provided. Rather, the tongue 322 is formed like an elongated blade pivotally secured by pivot posts 324, 326 to surrounding portions of the rectangular frame 328 of the insert at interior locations thereof. This pivotal (or see-saw) mounting provides one end 329 which fits into an open (forward, central) space in the insert frame 328 and a second end 330 of the tongue which extends inwardly relative to the insert frame 328 to the center thereof and on which the receiver 332 is mounted. Then when the one end 328 is pressed downward as shown by the arrow 334 in FIG. 24 it causes the second end 330 to be pivoted upwardly as can be understood from the phantom lines in that figure and as shown by arrow 336, in a lever-type action. When the pressure is released the tongue 322 returns to its normal or lower position due in part to the elastic tension in the pivot posts 324, 326 and primarily due to gravity.

A further locking mechanism for the tongue 346 when it extends the full length of the insert frame 348 is shown in FIGS. 24 and 25 generally at 350. Locking mechanism 350 comprises an angled member 352 having a head portion 354 extending upwardly into a slot 356 in a top plate 358. The horizontal leg 360 of the angled member 352 then extends a distance out from underneath the top plate 358 and is biased to an outward position by a spring 362 beneath the top plate. Spring 362 biases horizontal leg 360 such that it overhangs the tongue 346 when the tongue is in the lower position to hold the tongue in that position. Then when the head portion 354 is moved in the slot 356 against the bias of the spring 362, away from the tongue 346 and thereby compressing the spring 362, the horizontal leg 360 disengages from the tongue thereby allowing the tongue to rise, as depicted by arrow 364.

Figure 27:
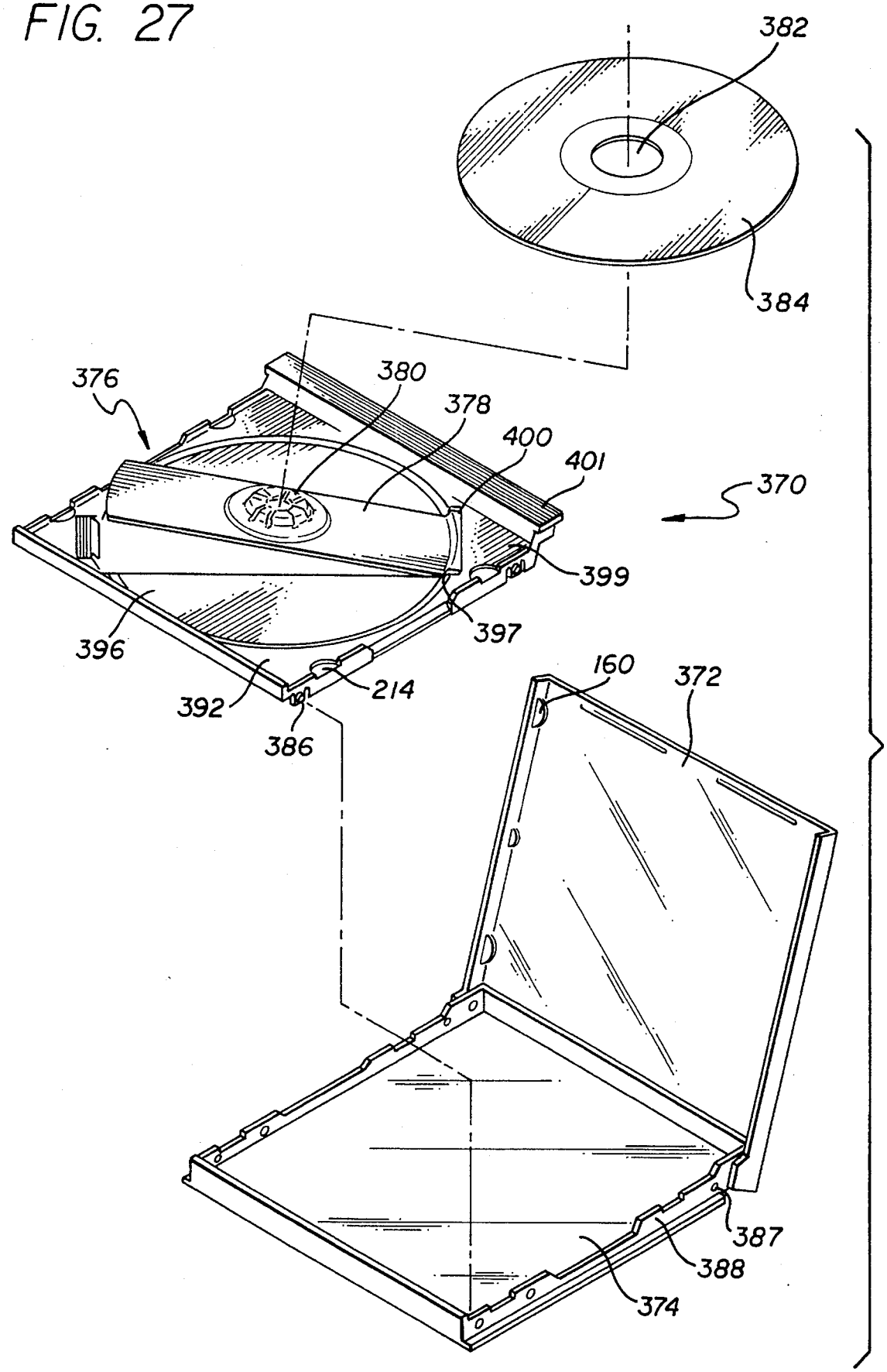
FIG. 27 is an exploded perspective view of a sixth compact disc storage container of the present invention, showing the positioning of a compact disc therein (or removal therefrom).
Figure 31:
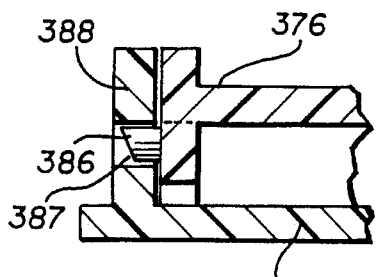
FIG. 31 is an enlarged, cross-sectional view taken on line 31—31 of FIG. 28.

FIG. 27 shows generally at 370 an exploded perspective view of another compact disc storage container of the present invention. Container 370 includes a cover 372 and a bottom tray 374 similar to those of FIG. 11, and a tongue assembly insert shown generally at 376 and which includes an integral tongue 378 having a receiver 380 disposed thereon. The receiver 380 is adapted to fit snugly into the central aperture 382 of a compact disc 384, similar to those previously-described. Similar to the insert of FIG. 11, the insert 376 snap-fits with side posts 386 into lateral openings 387 into the bottom tray walls 388, as best shown in FIG. 31. The elongated tongue 378 of this insert 376 extends diagonally relative to the rectangular frame 392 of the insert. The diagonal orientation provides for greater surface area in which to more accessibly locate the release button and for the consumer's ease in pressing the button. The tongue 378 is integrally formed at its rear end with the adjacent insert frame 392 at the edge of the recessed area 396. The junction of the tongue 378 extends up the sidewall 397 of the recessed area 396 to the upper plate 399 and joins it at a junction 400 having a narrow cross-section. The narrow cross-section of the junction 400 is formed in the injection molding process. It is also formed with an elastic memory naturally biasing the tongue 390 to the raised position as shown in FIG. 29A. The elongated member portion 401 of the insert fits over the pivot axis of the cover 372 relative to the tray 374 similar to container 140.

Figure 30:
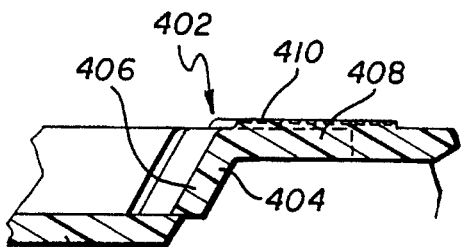
FIG. 30 is an enlarged, cross-sectional view taken on line 30—30 of FIG. 28.
Figure 30A:
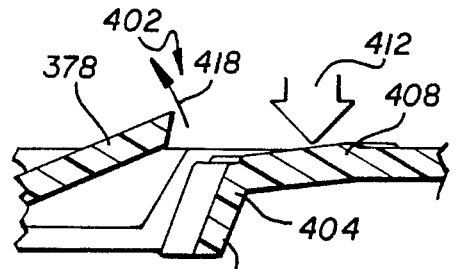
FIG. 30A is a view similar to that of FIG. 30, showing the locking mechanism in an unlocked releasing position.

A locking mechanism for locking the tongue 390 in the lower storage position against its natural upward bias is shown in FIGS. 30 and 30A generally at 402. As can be appreciated by those skilled in the art, any of the other locking mechanisms disclosed herein can be adapted and used for this embodiment. The locking mechanism 401 includes a locking member 404 having a downwardly-angled overhang portion 406 and a top member 408 having a top surface with a raised or scored surface 410 which defines the pressing down area. When this surface 410 is pressed down, as shown by arrow 412 in FIG. 30A, it causes the angled overhang member 406 to pivot outwardly, thereby disengaging down and from over the tip of the tongue 378. This unlocks the tongue 378 allowing it to return, as shown by the arrow 418 in FIG. 30A, to its natural upward, raised position.

Figure 28:
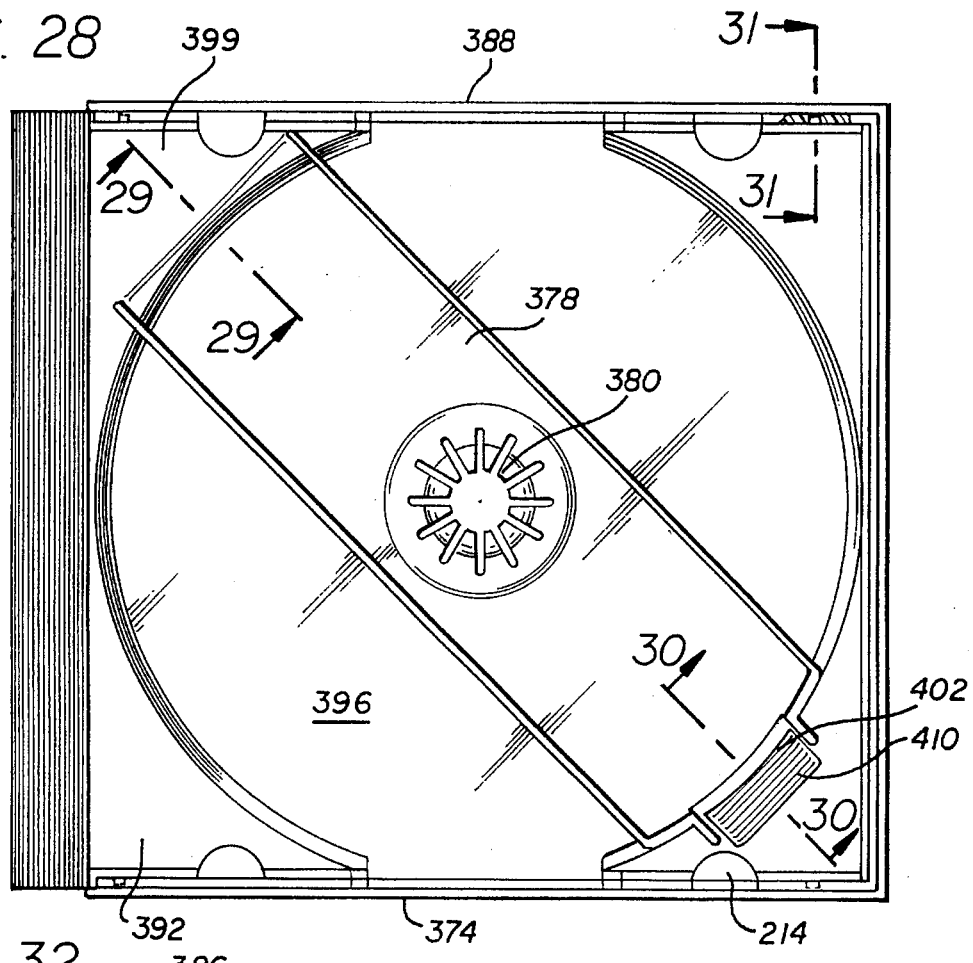
FIG. 28 is a top plan view of the insert and the bottom tray of the container of FIG. 27.
Figure 32:
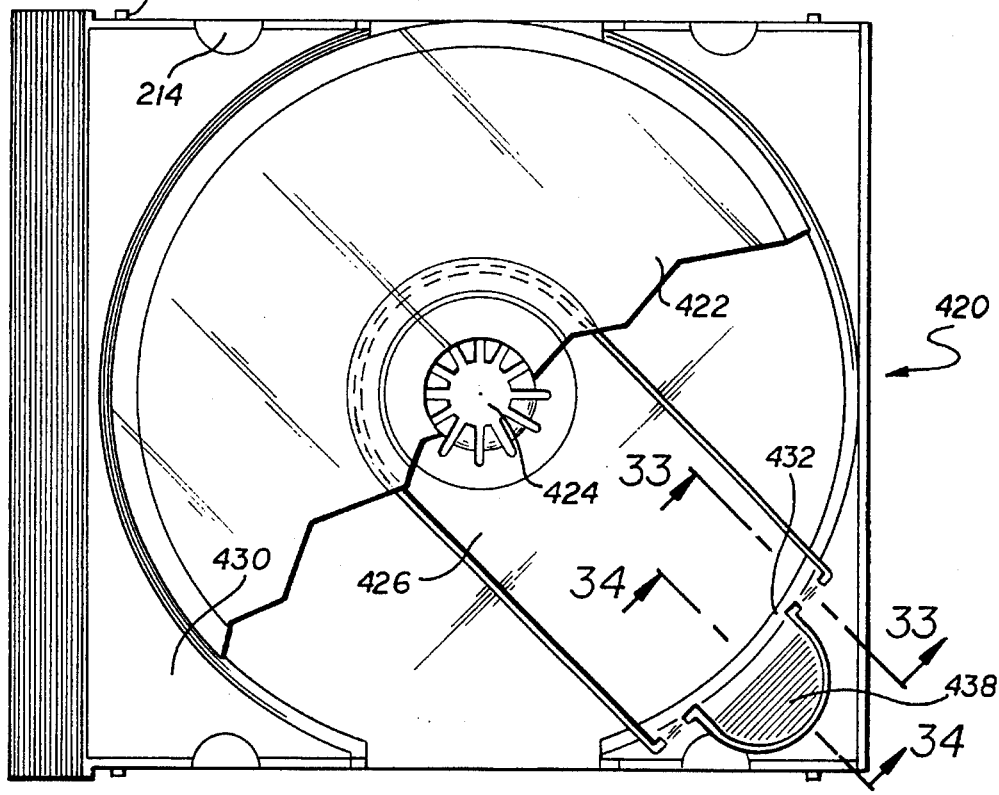
FIG. 32 is a top plan view of an alternative insert for a storage container of the present invention.

FIG. 32 shows generally at 420 an alternative tongue assembly insert of the present invention, which for example, can be substituted for insert 376 that of FIG. 27. FIG. 32, in contrast to FIG. 28, shows a compact disc 422, partially broken away, mounted on the receiver 424 on the free end of the tongue 426 and does not show the bottom tray. The tongue 426 of FIG. 32 is similar to that of FIG. 23 in that it is naturally biased in its lower or horizontal position as opposed to its raised position, and in that it extends only to the center of the frame 430 and does not extend the full diameter (or width or length) thereof. However, it differs from the tongue and insert of FIG. 23 in that it is diagonally mounted. In other words, the pivotal connection 432 of the tongue 426 to the frame 430 is in one of the forward corners of the frame. Advantages of a diagonal mounting arrangement have been previously discussed.

Figure 29:
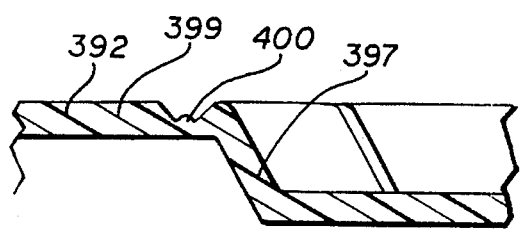
FIG. 29 is an enlarged, cross-sectional view taken on line 29—29 of FIG. 28.
Figure 29A:
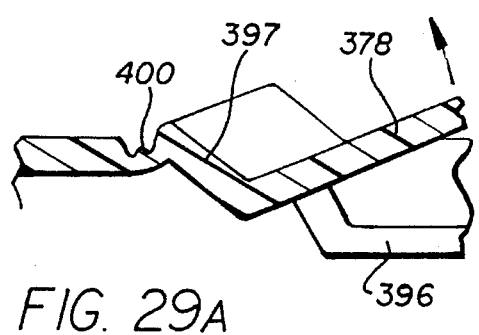
FIG. 29A is a view similar to that of FIG. 29, showing the tongue in a raised position.
Figure 33:
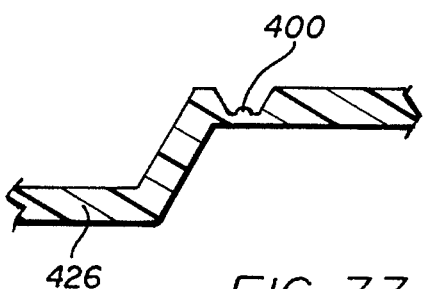
FIG. 33 is an enlarged cross-sectional view taken on line 33—33 of FIG. 32.
Figure 34:
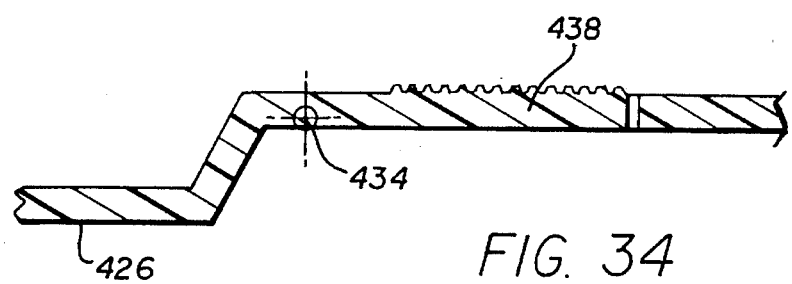
FIG. 34 is an enlarged cross-sectional view taken on line 34—34 of FIG. 32.
Figure 34A:
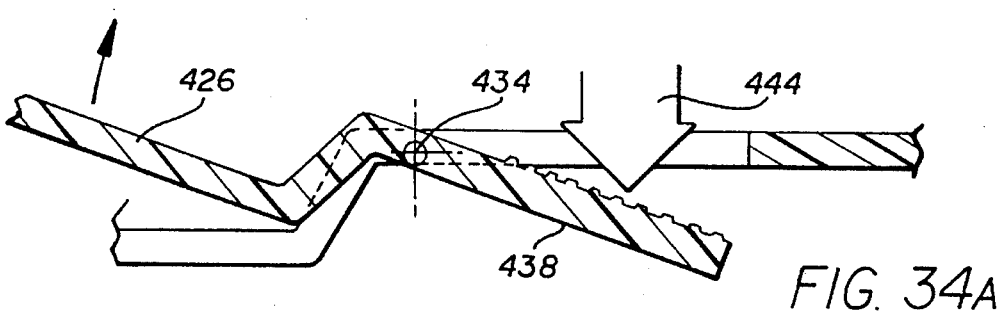
FIG. 34A is a view similar to that of FIG. 34, showing the tongue being pivoted to a raised position.

FIG. 33 shows the connection of the tongue 426 to the insert frame 430, similar to the connection of FIG. 29, but without an elastic bias thereto. This connection can be a pivot-post type connection 434 wherein the posts have an elastic memory biasing the tongue 426 to its lower position, as opposed to its raised or upper position. At the end of the tongue 426 opposite to its connection 434 to the frame 430 is a semi-circular member 438 as seen in FIG. 32 with a gap provided between its outer periphery and the adjacent surface of the frame. The top of this member 338 is formed as a rough surface to better define the pressing down surface and to provide a frictional contact with the user's finger. That is, when the user presses down with his finger as shown by the arrow 444 in FIG. 34A on surface 438, the tongue 426 is pivoted about its pivot post 434 to its raised position.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A compact disc storage container, comprising:
   a box having a bottom, sidewalls, and an open top, said bottom and said sidewalls together defining a generally central, recessed compact disc storage space which is accessible from said top;
   a compact disc mover underlying said storage space, said mover including a tongue having a tongue free end and a tongue opposite end, said opposite end being integrally formed with and hinged to said box, said free end being biased upwardly due to an elastic memory connection of said tongue to said box, said tongue having a central, upraised compact disc hole receiver spaced from said opposite end to releasably hold a compact disc in the central hole thereof in said storage space; and
   holding means for releasably holding said free end generally in said storage space, generally below said top and against the upward bias of the elastic memory, said free end automatically moving upwardly above said top upon release of said holding means for facilitating manual removal of the disc from said mover, and thus from said box, by gripping only the outer peripheral edges of the disc.

2. The container of claim 1 further comprising a cover lid hinged to said box and movable between a closed position which prevents said tongue free end from automatically rising above said top and an open position which permits said free end to rise and the manual removal of the disc from said mover and thereby away from said box.

3. The container of claim 1 wherein said holding means includes a cover movable between an open position relative to said box and a closed position wherein said free end is in said storage space.

4. The container of claim 1 wherein said holding means includes a detent in said box, said detent holding said free end against the upward bias.

5. The container of claim 4 wherein said tongue extends substantially entirely across said box from one side thereof to an opposite side thereof, and wherein said detent is disposed at a side of said box adjacent said free end.

6. The container of claim 4 wherein said detent is integrally formed with and in said box.

7. A storage container for storing generally flat articles, said container comprising:
   a box including a bottom tray and a cover, said cover being movable between alternative open and closed positions relative to said bottom tray; and
   a tongue assembly positionable in said bottom tray, said tongue assembly including an assembly frame and a tongue, said tongue having a tongue free end;
   wherein said tongue is pivotally connected to said assembly frame and pivotally movable relative thereto between a lower position for storage of a generally flat article generally above said tongue free end and in said box and a raised position for removal, with said cover in the open position, of a generally flat article generally off of said tongue free end and out from storage in said box;
   wherein said tongue and said assembly frame are integrally formed together as a single unit;
   wherein said tongue, said assembly frame and the pivotal connection therebetween are integrally formed together in an injection molding procedure; and
   wherein said tongue when formed in the injection molding procedure is formed in the raised position at generally a thirty degree angle.

8. The container of claim 7 wherein the lower position is the normal, released position of said tongue.

9. The container of claim 7 wherein the raised position is the normal, released position of said tongue.

10. The container of claim 9 further comprising locking means for releasably locking said tongue in the lower position.

11. The container of claim 10 wherein said locking means includes a locking member secured to said assembly frame.

12. The container of claim 7 wherein said tongue assembly is removable from and insertable into said box, in a snap-fit position with said cover in the open position.

13. The container of claim 12 wherein said cover is pivotally coupled to said bottom tray and is thereby pivotal between the open and closed positions.

14. A storage container for storing generally flat articles, said container comprising:
   a box including a bottom tray and a cover, said cover being movable between alternative open and closed positions relative to said bottom tray;
   a tongue assembly positionable in said bottom tray, said tongue assembly including an assembly frame and a tongue, said tongue having a tongue free end;
   wherein said tongue is pivotally connected to said assembly frame and pivotally movable relative thereto between a lower position for storage of a generally flat article generally above said tongue free end and in said bottom tray and a raised position for removal, with said cover in the open position, of a generally flat article generally off of said tongue and out from storage in said box;
   wherein said tongue is normally biased up to the raised position; and
   locking means for releasably locking said tongue to said assembly frame, in the lower position and against the upward bias.

15. The container of claim 14 wherein said locking means allows said tongue to be manually unlocked with said cover in the open position and thereby allows said tongue to return to the normal raised position.

16. The container of claim 14 wherein said locking means includes a locking member secured to said assembly frame and engageable with said tongue.

17. The container of claim 16 wherein said assembly frame is rectangular, has four sides and four corners.

18. The container of claim 17 wherein said locking member is secured to the center of one of said sides.

19. The container of claim 17 wherein said locking member is secured to and at one of said corners.

20. The container of claim 16 wherein said locking means is released by pressing said locking member in a direction relative to said frame assembly.

21. The container of claim 20 wherein the direction is primarily lateral and outward relative to said assembly frame.

22. The container of claim 20 wherein the direction is primarily downward relative to said assembly frame.

23. A storage container for storing generally flat articles, said container comprising:

a box including a bottom tray and a cover, said cover being movable between alternative open and closed positions relative to said bottom tray; and a tongue assembly positionable in said bottom tray, said tongue assembly including an assembly frame and a tongue, said tongue having a tongue free end;

wherein said tongue is pivotally connected with a connector having an elastic memory to said assembly frame and pivotally movable relative thereto between (1) a lower position for storage of a generally flat article generally above said tongue free end and in said box and (2) a normal raised position, biased thereto by the elastic memory, for removal, with said cover in the open position, of a generally flat article generally off of said tongue and out from storage in said box.

24. The container of claim 23 wherein said assembly frame, said tongue and the elastic memory connector are integrally formed together as a single unit in an injection molding procedure.

25. The container of claim 24 wherein said tongue when formed in the injection molding procedure is in the raised position.

26. The container of claim 23 wherein said assembly frame is a rectangular structure having four sides, and said connector is at a center of one of said sides.

27. A storage container for storing generally flat articles, said container comprising:

a box including a bottom tray and a cover, said cover being movable between alternative open and closed positions relative to said bottom tray; and a tongue assembly positionable in said bottom tray, said tongue assembly including an assembly frame and a tongue;

wherein said tongue has a tongue free end, an opposite end and a pivotal connector; and wherein said tongue is pivotally connected to said assembly frame via said pivotal connector and pivotally movable relative thereto between a normal lower position for storage of a generally flat article generally above said tongue and in said box and by pressing down on said opposite end, a raised position for removal, with said cover in the open position, of a generally flat article generally off of said tongue and out from storage in said box.

28. The container of claim 27 wherein said assembly frame comprises a rectangular structure having four sides and four corners, and said tongue extends inward generally towards a center of said rectangular structure.

29. The container of claim 28 wherein said pivotal connector is at a center of one of said sides.

30. The container of claim 28 wherein said free end is generally at said center and said free end is spaced a distance inward from said side which is opposite to said one side.

31. The container of claim 30 wherein the flat article is a recording medium having a central aperture, and further comprising holding means on top of said tongue for fitting into the central aperture to position and hold the recording medium on said tongue.

32. The container of claim 29 wherein said one side has an opening and said opposite end is disposed in said opening.

33. A storage container for storing generally flat articles, said container comprising:

a box including a bottom tray and a top cover, said bottom tray having a recessed storage region for storing a generally flat article having a central aperture, a tray end, and an elongated member extending generally along said tray end;

wherein said top cover is pivotally attached to said bottom tray for pivotal movement generally about said tray end between alternative open and closed positions;

a pivotal connector which pivotally connects said tongue to said elongated member such that said tongue is pivotal between a raised position and a storage position;

wherein said elongated member, said tongue and said pivotal connector are integrally formed together as a single unit; and receiver means on said tongue for receiving thereon a central aperture of the article and thereby retaining the article on said tongue;

wherein said box includes a bottom which includes said elongated member and said connector and out of which said tongue is formed; and wherein said tongue is cut out of said bottom.

34. The container of claim 33 wherein said bottom has a central recessed area defining at least in part said recessed storage region.

35. The container of claim 33 wherein said bottom has a central cut-out area defining at least in part said recessed storage region.

36. The container of claim 33 wherein said tongue extends the length of said bottom tray to a tray side opposite to said tray end, and said tongue has a free end opposite to said pivotal connector.

37. The container of claim 36 wherein said receiver means is positioned generally centrally between said free end and said pivotal connector.

38. The container of claim 37 further comprising biasing means for biasing said tongue to the raised position.

39. The container of claim 38 further comprising locking means for releasably locking said free end against the bias of said biasing means and said tongue in the storage position.

40. The container of claim 39 wherein said locking means includes a see-saw locking assembly having first and second ends on opposite sides of a fulcrum, said first end when pressed down causing said second end to raise and release a locking action on a free end of said tongue.

41. A recording medium storage container, comprising:

a base assembly having a floor, a storage area and an open top;

a cover, said cover and said base assembly being movable relative to one another between a closed position wherein said cover is generally over said open top and an open position wherein access is available into said base assembly through said open top; and an elongated lifter member having an integral connector end connected to said base assembly and an opposite free end, said free end being movable relative to said base assembly between a storage position and a raised position, said connector end and at least a portion of at least one of said cover and said base assembly being integrally formed together as a single unit, with said lifter member in the raised position and with an elastic memory associated with said connector end which biases said lifter member from the storage position to the raised position, so as to move a recording medium supported at least in part by said lifter member to an accessible grasping and removal position with said cover and said base assembly in the open position.

42. The container of claim 41 wherein said at least a portion is removable from and insertable into said base assembly together with said lifter member.

43. The container of claim 41 wherein said base assembly includes a lifter frame separable from said floor and to which said lifter member is pivotally secured.

44. The container of claim 43 wherein said lifter frame is rectangular and includes a frame corner, said lifter member is pivotally secured to said corner and extends diagonally relative to said rectangular lifter frame.

45. A method of operating a storage container, comprising the steps of:

providing a bottom tray and a cover, the cover being attached to the bottom tray to provide for pivotal movement of the cover relative to the bottom tray between alternative open and closed positions, the bottom tray and the cover attached thereto forming a storage box;

providing a tongue assembly which includes an enclosed assembly frame and a tongue pivotally connected thereto and pivotal between lowered and raised positions; and inserting the tongue assembly into the bottom tray such that the assembly frame is in a fitted position therein such that with the cover in the closed position and the tongue in the lowered position a generally flat article can be stored in the storage box above the tongue and such that with the cover in the open position and the tongue in the raised position the stored article is repositioned so that an end thereof is lifted out of the bottom tray and accessible for grasping and removal from the storage box; and wherein the hinge connection has an elastic memory which biases the tongue to the raised position.

46. The method of claim 45 further comprising locking the tongue in the lowered position.

47. The method of claim 46 wherein said locking step is with the cover in the open position.

48. The method of claim 46 further comprising moving the cover to the open position and thereafter unlocking the tongue and thereby allowing the tongue to move to the raised position.

49. The method of claim 48 wherein said unlocking step includes manually pushing against a locking member on the frame.

50. The method of claim 49 wherein said pushing step includes pushing the locking member in a primarily downward direction.

51. The method of claim 49 wherein said pushing step includes pushing the locking member in a primarily longitudinally and outward direction relative to the bottom tray.

52. The method of claim 45 wherein said inserting step is after the cover has been attached to the bottom tray.

53. The method of claim 45 wherein the frame is rectangular, and said inserting step includes snap fitting the frame to the bottom tray and to respective walls of the tray.

54. The method of claim 45 wherein said assembly frame providing step includes the frame and the tongue and their hinge connection being integrally formed together.

55. The method of claim 45 wherein the raised position is the normal position of the tongue, and further comprising manually moving the cover from the open to the closed position and thereby moving the tongue from the normal raised position to the lower position.

56. The method of claim 45 wherein the bottom tray has a floor and walls and said inserting step includes snap fitting the frame to the walls.

57. The method of claim 45 wherein the article comprises a compact disc, and further comprising, with the cover in the open position, inserting the compact disc into the storage box and generally on the tongue.

58. The method of claim 45 wherein the article comprises a compact disc, and further comprising, with the cover in the open position and the tongue in the raised position, removing a compact disc from off of the tongue.

59. The method of claim 45 wherein the article comprises a compact disc, and further comprising grasping only by its edges a compact disc which is supported by the tongue when in the raised position, and thereafter, lifting the grasped disc out of the storage box.

60. The method of claim 45 wherein the article comprises a compact disc and the tongue has a free end and raised top structure thereon, and further comprising positioning a compact disc on the tongue with the disc central opening positioned over and onto the raised top structure.

61. The method of claim 45 wherein the tongue has a free end, an opposite end and therebetween a pivotal connector to the frame, and further comprising pushing down on the opposite end and thereby moving the tongue from the lowered to the raised position.

62. The method of claim 61 wherein the article comprises a recording medium having a central aperture, the tongue includes at least one projector thereon which is fitted into a central aperture of a recording medium, and further comprising after said moving step and with the tongue in the raised position, lifting the recording medium off of the projector.

63. The method of claim 45 wherein said inserting step is after the cover has been pivotally secured to the bottom tray.

64. A method of constructing a compact disc storage container, comprising the steps of:

forming a compact disc storage box; and integrally forming together as a single unit an elongated member and a compact disc lifting tongue, the lifting tongue being pivotal relative to the elongated member between a natural raised position and a lower position, the tongue when released from the lower position returning to the natural raised position due to an elastic memory of the connection of the tongue to the elongated member, the elongated member being positionable in the box.

65. The method of claim 64 wherein said integrally forming together step is by injection molding.

66. The method of claim 64 wherein said integrally forming together step is by vacuum forming.

67. The method of claim 64 wherein said forming step and said integrally forming together step include forming the box and the elongated member simultaneously together in a single forming operation.

68. The method of claim 64 further comprising after said forming and integrally forming together steps, inserting the elongated member and the tongue into position in the box.

69. The method of claim 64 wherein said forming step includes forming a lid, forming a bottom tray, and thereafter pivotally attaching the lid to the tray to thereby define the storage box.

70. The method of claim 64 wherein said integrally forming together step includes forming on a top surface of the tongue a compact disc aperture retainer.

71. The method of claim 64 wherein said integrally forming together step includes the elongated member being a side of a rectangular frame and the box includes sidewalls, and further comprising snap-fitting the frame to inside surfaces of the sidewalls.

72. A compact disc support assembly, comprising:

a support frame defining a substantially circular compact disc storage area, said support frame having a sidewall structure at least substantially encircling said storage area;

a tongue pivotally secured to said support frame and extending generally into said support area; and retaining means on said tongue for receiving thereon a central aperture of a compact disc and for thereby releasably retaining the compact disc on said tongue;

wherein said tongue, with said retaining means holding the compact disc thereon, is pivotal from a lower position wherein the compact disc is substantially in said storage area to a raised position wherein the compact disc is pivoted above said support frame which facilitates accessible grasping and removal of the compact disc off of said tongue and from said support frame;

wherein said tongue is pivotally secured to said support frame about a pivotal connector with a first portion of said tongue on one side of said pivotal connector and a second portion of said tongue on the other side; and wherein said retaining means is mounted on said first portion and said second portion forms a push-down surface which when pressure is applied thereagainst raises said tongue from the lower position to the raised position.

73. The assembly of claim 72 wherein said pivotal connector biases said tongue to the lower position.

74. The assembly of claim 72 wherein said sidewall structure has an opening at a central location on one side thereof and said second portion fits into said opening when said tongue is in the lower position.

75. The assembly of claim 72 wherein said sidewall structure has an opening at a corner surface thereof and said second portion fits into said opening when said tongue is in the lower position.

76. The assembly of claim 72 wherein at least one of said support frame and said tongue includes biasing means for biasing said tongue to the raised position.

77. The assembly of claim 72 wherein said tongue and said support frame are formed together in an injection molding procedure.

78. The assembly of claim 72 wherein said tongue extends across said support area and said retaining means is positioned at a top central location of said tongue.

79. The assembly of claim 78 further comprising securing means for releasably securing said tongue in the lower position.

80. The assembly of claim 72 wherein said tongue and said support frame are integrally formed together as a single unit.

81. The assembly of claim 72 wherein said tongue is secured to said support frame with an elastic memory connection which biases said tongue to the raised position.

82. The assembly of claim 81 wherein said elastic memory connection includes a molded-in score line.

83. The assembly of claim 72 further comprising snap-in securing means for snap-in securing of said support frame into a bottom of an outer box having a cover.

84. The assembly of claim 72 wherein said tongue is biased to the raised portion, and further comprising push-member locking means for locking said tongue in the lower position and against the bias.

85. The assembly of claim 72 wherein said storage area defines a round through-open area through said support frame.

86. A method of operating a storage container, comprising the steps of:

providing a bottom tray and a cover, the cover being attached to the bottom tray to provide for pivotal movement of the cover relative to the bottom tray between alternative open and closed positions, the bottom tray and the cover attached thereto forming a storage box;

providing a tongue assembly which includes an enclosed assembly frame and a tongue pivotally connected thereto and pivotal between lowered and raised positions;

inserting the tongue assembly into the bottom tray such that the assembly frame is in a fitted position therein such that with the cover in the closed position and the tongue in the lowered position a generally flat article can be stored in the storage box above the tongue and such that with the cover in the open position and the tongue in the raised position the stored article is repositioned so that an end thereof is lifted out of the bottom tray and accessible for grasping and removal from the storage box;

wherein the tongue has a free end, an opposite end and therebetween a pivotal connector to the frame; and pushing down on the opposite end and thereby moving the tongue from the lowered to the raised position.

87. The method of claim 86 wherein the article comprises a recording medium having a central aperture, the tongue includes at least one projector thereon which is fitted into the central aperture of the recording medium, and further comprising after said moving step and with the tongue in the raised position, lifting the recording medium off of the projector.

88. The method of claim 86 wherein said pushing down is with the cover in the open position, and said moving is about the pivotal connector.

89. The method of claim 86 wherein said pushing step is directly with a portion of the user's hand.

90. The method of claim 86 wherein said pushing down is with one of the user's fingers or thumb on a push-down surface in a corner of the assembly frame.

91. A compact disc support assembly, comprising:

a support frame defining a substantially circular compact disc storage area, said support frame having a sidewall structure at least substantially encircling said storage area;

a tongue pivotally secured to said support frame and extending generally into said support area;

retaining means on said tongue for receiving thereon the central aperture of a compact disc and for thereby releasably retaining the compact disc on said tongue;

wherein said tongue, with said retaining means holding the compact disc thereon, is pivotal from a lower position wherein the compact disc is substantially in said storage area to a raised position wherein the compact disc is pivoted above said support frame which facilitates accessible grasping and removal of the compact disc off of said tongue and from said support frame; and wherein said tongue is secured to said support frame with an elastic memory connection which biases said tongue to the raised position.

92. The assembly of claim 91 wherein said elastic memory connection includes a molded-in score line.

93. A compact-disc storage and handling tray, comprising:

an assembly defining a recessed compact disc receiving area;

a tongue extending into a center of said area and having a tongue free end;

a compact disc receiver on said tongue free end; and a press-down portion at least partially outside of said area, said press-down portion being operatively connected to said tongue such that when said press-down portion is pressed down relative to said area, said free end is lifted from a normal lower position to a raised position relative to said area to provide access to a compact disc on said compact disc receiver.

94. The tray of claim 93 wherein said tongue extends inwardly from a corner of said assembly.

95. The tray of claim 93 further comprising securing means for securing said assembly into a storage box including a pivoting cover.

96. The tray of claim 95 wherein said push-down portion is adapted to be operated when the pivoting cover is in an open position.

97. The tray of claim 93 further comprising a cover pivotally attached relative to said assembly and pivotal between open position allowing insertion and removal of a compact disc from said area and a closed position covering a compact disc in said area.

98. The tray of claim 93 wherein said press-down portion is centered on a longitudinal axis of said tongue and is narrower in plan view such that both sides of said portion are inset from corresponding sides of said tongue.

99. The tray of claim 98 wherein a hinge connects said press-down portion to said tongue.

100. The tray of claim 99 wherein said hinge comprises pivot posts.

101. The tray of claim 93 further comprising an elastic connection connecting said tongue to said assembly with an elastic memory biasing said tongue to the normal lower position.

102. The tray of claim 93 wherein said tongue and said press-down portion are integrally formed.

103. The tray of claim 93 wherein said tongue is connected to said assembly with an elastic memory connection.

104. The tray of claim 93 wherein said assembly includes a top plate, a sidewall about at least a portion of a perimeter of said area, and a floor in said area, said floor having an elongate opening in which said tongue is disposed when in the lower position.

105. The tray of claim 93 wherein said structure includes a floor and said tongue when in the lower position is substantially coplanar with said floor with a narrow gap between said floor and said tongue and about a perimeter of said tongue.

* * * * *